United States Patent
Brister et al.

(10) Patent No.: US 7,841,315 B1
(45) Date of Patent: *Nov. 30, 2010

(54) SAFETY FUEL TANK AND FILLER CAP APPARATUS

(75) Inventors: Charles Brister, P.O. Box 649, Roseland, LA (US) 70456; Ed Chandler, Hammond, LA (US)

(73) Assignee: Charles Brister, Amite, LA (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/021,865

(22) Filed: Jan. 29, 2008

Related U.S. Application Data

(63) Continuation of application No. 11/548,908, filed on Oct. 12, 2006, now Pat. No. 7,322,338.

(51) Int. Cl.
*F02P 11/00* (2006.01)
*F02D 17/00* (2006.01)

(52) U.S. Cl. .................. 123/198 D; 123/198 DC

(58) Field of Classification Search ......... 123/198 D, 123/198 DB, 198 DC
See application file for complete search history.

(56) References Cited

U.S. PATENT DOCUMENTS

| | | | | | |
|---|---|---|---|---|---|
| 3,572,305 | A * | 3/1971 | Moragne | ............. | 123/146.5 R |
| 3,759,075 | A * | 9/1973 | Lipschutz | ............. | 70/159 |
| 3,885,547 | A * | 5/1975 | Doepke et al. | ............. | 123/198 D |
| 4,583,072 | A * | 4/1986 | Matsushita | ............. | 340/457 |
| 4,809,869 | A * | 3/1989 | Cosgrove et al. | ............. | 220/288 |
| 6,112,714 | A * | 9/2000 | Brister | ............. | 123/198 D |
| 6,260,516 | B1 * | 7/2001 | Brister | ............. | 123/41.15 |
| 6,285,934 | B1 * | 9/2001 | Shaw | ............. | 701/36 |
| 6,397,791 | B1 * | 6/2002 | Brister | ............. | 123/41.15 |
| 6,575,131 | B2 * | 6/2003 | Brister | ............. | 123/198 D |
| 7,131,469 | B2 * | 11/2006 | Dunkle | ............. | 141/100 |
| 7,322,337 | B1 * | 1/2008 | Brister et al. | ............. | 123/198 D |
| 7,322,338 | B1 * | 1/2008 | Brister et al. | ............. | 123/198 D |
| 7,523,722 | B2 * | 4/2009 | Valentine et al. | ............. | 123/1 A |

* cited by examiner

*Primary Examiner*—Hai H Huynh
(74) *Attorney, Agent, or Firm*—Garvey, Smith, Nehrbass & North, L.L.C.; Charles C. Garvey, Jr.

(57) ABSTRACT

A safety fuel tank and filler cap arrangement is disclosed wherein the cap attaches to an internal combustion engine having a fuel tank and a starter or ignition system. The tether that connects the cap to the engine ignition or starter is an electrical conduit that can disable the engine so that it will not run or start if the cap is separated from the fuel tank such as when a user wants to fill it with gasoline. In one embodiment, a switch arrangement is contained entirely within the cap. In another arrangement a ring attaches to the tether and a conventional cap engages the ring to enable ignition when the cap is added to the fuel tank.

19 Claims, 29 Drawing Sheets

External contacts

Mechanical Switch with Plunger

Mechanical Switch with Plunger

Reed Switch with Plunger

Reed Switch with Plunger

External Reed Switch

External Reed Switch with swivel

External Reed Switch with swivel

External Mechanical Switch

External Mechanical Switch

External Reed Switch

External Reed Switch

Mechanical Switch

Mechanical Switch

Rubber enclosed circular contact switch

Rubber enclosed circular contact switch

Rubber enclosed circular contact switch

Rubber enclosed circular contact switch

Rubber enclosed circular contact switch

Internal contacts

Internal contacts

External contacts

External contacts

SAFETY FUEL TANK AND FILLER CAP APPARATUS

CROSS-REFERENCE TO RELATED APPLICATIONS

This is a continuation of co-pending U.S. patent application Ser. No. 11/025,530, filed Dec. 29, 2004, which is incorporated herein by reference.

Priority of U.S. Provisional Patent Application Ser. No. 60/533,295, filed Dec. 30, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to small internal combustion engines of the type that are used to power lawn mowers, tillers, lawn vacuums, weed trimmers, snow blowers, water blasters and the like. More particularly, the present invention relates to an improved safety fuel tank and filler cap apparatus that automatically disables the magnoelectric generator, starter, or other ignition system of a small internal combustion engine when a fuel filler cap portion of the apparatus is separated from a fuel filler flange such as when the fuel filler cap inadvertently disconnects from the fuel tank or is removed for filling the fuel tank. More particularly, the present invention provides a switch that disables the ignition system of the engine and prevents the spark plug/plugs from firing by disabling the magnoelectric generator or inductive ignition coil. In doing so, the engine ceases to run if the cap is loosened or was removed. In the preferred embodiment, the engine will not run or start even if the starter motor still cycles the engine.

2. General Background of the Invention

The flash point of a liquid such as gasoline should not be confused with the temperature necessary to ignite the vapors, for unless a source of heat considerably hotter than the flash point of the fuel comes into direct contact with the vapors, the fuel will merely give off vapors without burning. An essential factor in the process of combustion is oxygen. Without oxygen, even the most flammable vapors will not combust. Under normal conditions, a flame draws the amount of oxygen necessary to sustain combustion from the air. When the oxygen content of the air falls below about 15%, there is an immediate extinguishment of practically all flames.

There is typically a wide temperature difference between the flash point of a fuel and the ignition temperature. For example, the flash point (vapor given off) of gasoline is minus 43 degrees centigrade (minus 45.4 degrees Fahrenheit), and the ignition temperature (heat necessary to ignite the mixture) is about 257 degrees centigrade (494.6 degrees Fahrenheit). A small flame can be drawn into lube oil which is at average room temperature and it will not burn, but with the addition of burning gasoline, vapors soon rise and burn to raise the temperature of the surrounding oil to the flash point.

Every year, fires cause serious and sometimes fatal bodily injury to operators of outdoor, yard and garden, and like implements such as lawn mowers, lawn vacuums, weed trimmers, water blasters, and the like. One of the most common safety problems is associated with the attempt by individuals to add gasoline to the internal combustion engine of a lawn mower or like implement that is still running. Another safety hazard occurs when a running implement gradually loosens the gas filler cap because of vibration. Typically, these small engine (e.g. 1-20 h.p.) equipped implements position the fuel tank and its filler neck at or near the engine block.

Fuel that spills from the fuel tank or from a supply container during filling of the tank may come into contact with hot surfaces on the engine block or accessories. If the user is not paying close attention to the gas tank and its filler cap, gasoline can begin to leak when the cap is loosened. This problem is especially acute with rear drive type implements such as all terrain vehicles, go-karts, riding lawn mowers and lawn tractors wherein the gasoline tank may be behind the operator or underneath a seat or hood preventing the user from seeing it. Many tractor style riding lawn mowers have such a hidden fuel tank and filler cap.

Many of these implements are operated by adolescent children that are not warned sufficiently by their parents about the danger of filling tanks with gasoline when the implement or vehicle is hot from operation.

Many manufacturers use decal warning stickers and user's manual warnings to warn a user to not remove the fuel filler cap until the engine cools for at least a couple of minutes.

Despite warnings, many users smoke when operating such an implement, so that if the cap loosens, the operator does not notice the escape of fumes if the engine continues to run.

Generators are often filled with gasoline by a user when still running because the user does not want to interrupt the flow of electricity to a home or appliance(s).

All of the above situations are hazardous if the engine continues to run when the filler cap is removed or becomes removed, or if a user attempts to fill the fuel tank when the engine is very hot.

A number of patents have issued to Charles Brister of Amite, Louisiana that relate to safety fuel tank and filler cap devices. The following table is a listing of those Brister patents, each of which is hereby incorporated herein by reference.

TABLE 1

| Patent No. | Title | Issue Date |
| --- | --- | --- |
| 6,112,714 | "Safety Fuel Tank and Filler Cap Apparatus | Sep. 05, 2000 |
| 6,260,516 | "Safety Fuel Tank and Filler Cap Apparatus" | Jul. 17, 2001 |
| 6,397,791 | "Safety Fuel Tank and Filler Cap Apparatus" | Jun. 04, 2002 |

BRIEF SUMMARY OF THE INVENTION

The present invention provides and improved safety fuel tank and filler cap apparatus for supplying fuel to an internal combustion engine that can be started with a magnetoelectric generator.

The apparatus includes an exposed fuel tank having a fill opening, a fuel filler flange surrounded by an adjoining fuel tank outer surface, the flange extending a short distance from the filler opening in the fuel tank wall.

A filler cap fits the fuel filler flange to form a closure of the tank at the fill opening, the filler tank and adjoining fuel tank outer surface are configured to enable a user to grip and turn the fuel filler cap.

A switch is interfaced between the filler cap and another engine part that disables ignition system (magnoelectric generator or inductive coil) or engine starter when the filler cap is removed from the fuel filler tank. This construction prevents the user from filling the fuel tank with gasoline when the engine is running.

The switch can be a reed switch, magnetic switch, mechanical switch such as a button switch, toggle switch, rocker switch, as examples.

The mechanical switch can be a switch that is carried by the cap and that disables engine starting when the cap is removed. A tether can be used to connect the cap with an engine ignition or starter wherein the tether includes electrical conduit for disabling the ignition or starter when the cap is removed. The switch can include a magnetic switch member or reed switch.

The switch can include a switch member mounted on the filler cap the does not interfere with the sealing of the fuel filler flange with the filler cap, being spaced from the threads or bayonet connectors that join the cap and tank.

The filler cap can have a top, an annular skirt with internal threads, and wherein the switch member is mounted on the annular skirt in between the threads and the top. Such internal threads form a threaded engaged connection with external threads on the fuel filler flange.

The fuel filler cap preferably has a top, an annular skirt with a threaded portion thereon, and an unthreaded outer surface and wherein the switch member is mounted on the annular skirt. The switch member can be mounted on an unthreaded portion of the filler cap, inside the cap or outside the cap in a housing on the outer surface of the cap.

The present invention also provides a powered implement that has a frame, an internal combustion engine mounted on the frame that includes a magnetoelectric generator for starting the engine, and including an exposed fuel tank having a fill opening, a fuel filler flange surrounded by an adjoining fuel tank outer surface, the flange extending a short distance from the filler opening in the fuel tank wall and wherein a filler cap fits the fuel filler flange to form a closure of the tank at the fuel opening.

The filler cap and adjoining fuel tank outer surface are configured to enable a user to grip and turn the fuel filler cap. A switch is interfaced between the fuel tank and filler cap with an electricity conveying tether that disables the magnetoelectric generator when the filler cap is removed from the fuel filler flange, the switch including switch portions mounted respectively on the fuel filler cap and a tether that spans between the cap and the engine ignition or starter.

The method and apparatus of the present invention a switch arrangement disables the ignition system of the engine, preventing the spark plug/plugs from firing by disabling the magnoelectric generator or inductive ignition coil. In doing so, the engine ceases to run if the cap is loosened or removed. Also, the engine will not run or start even if the starter motor is able to cycle the engine.

The implement can be for example a lawn mower, go-kart, garden tractor, lawn vacuum, snow blower, tiller, chain saw, weed trimmer, hedge clipper, or log splitter.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-12 show the preferred embodiment of the apparatus of the present invention designated generally by the numeral 10. Safety fuel tank and cap apparatus 10 is used in combination with a small internal combustion engine 11 such as is sold under the marks Briggs & Stratton, Honda, Kawasaki, Tecumseh and others as is known in the art.

Figure 1:
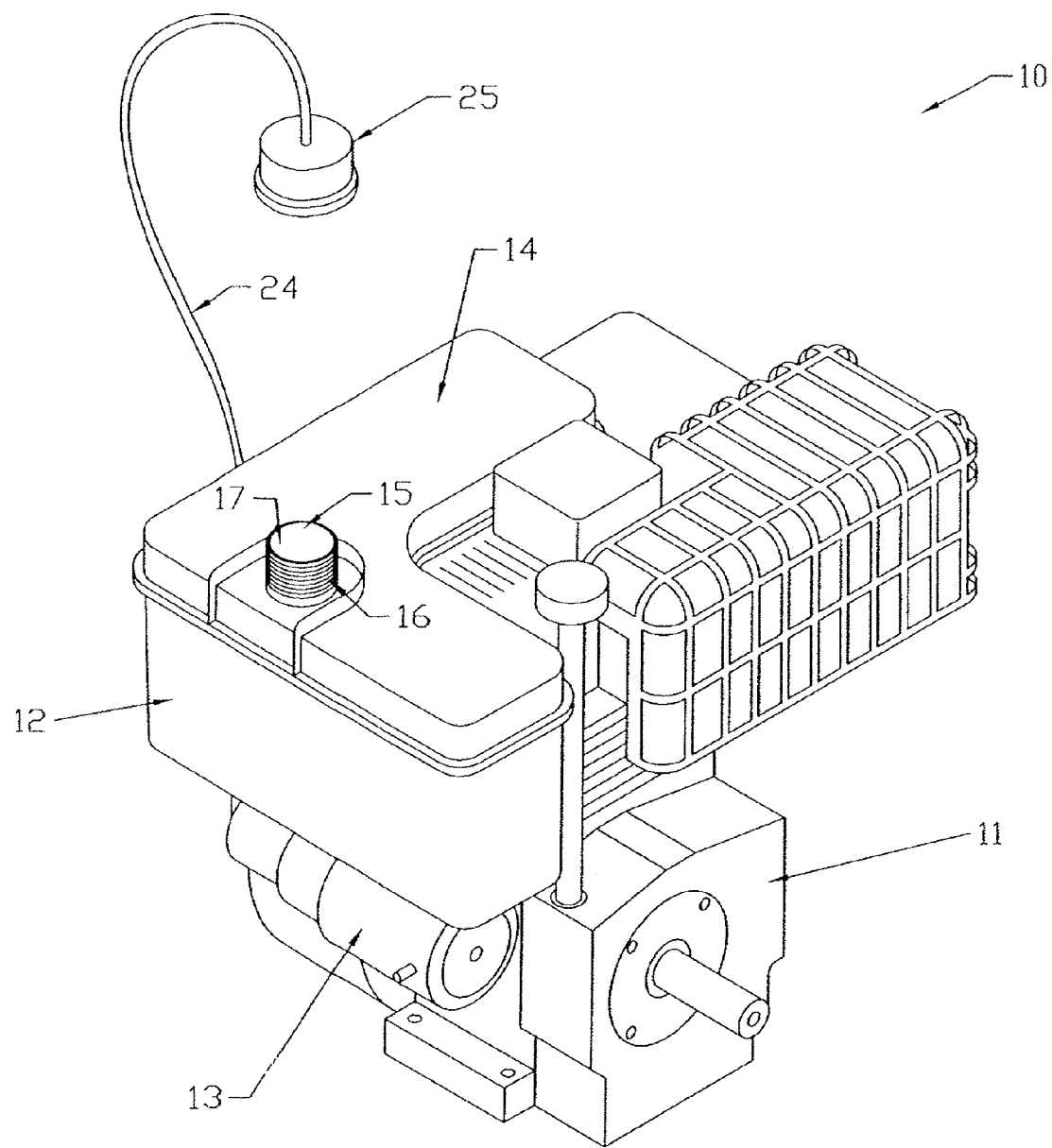
FIG. 1 is a perspective view of the preferred embodiment of the apparatus of the present invention showing the fuel filler cap in an open position.
Figure 2:
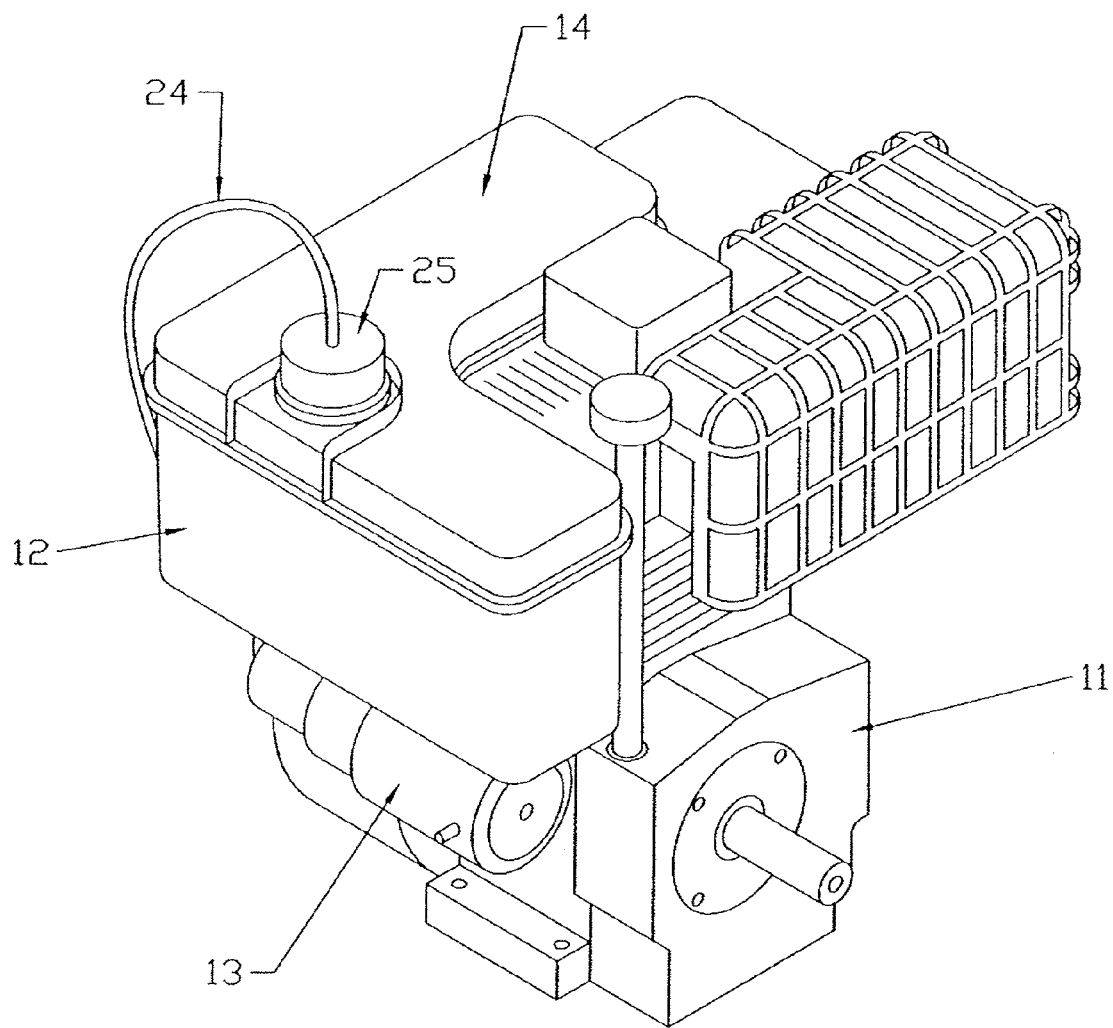
FIG. 2 is a perspective view of the preferred embodiment of the apparatus of the present invention showing the fuel filler cap in a closed position.
Figure 3:
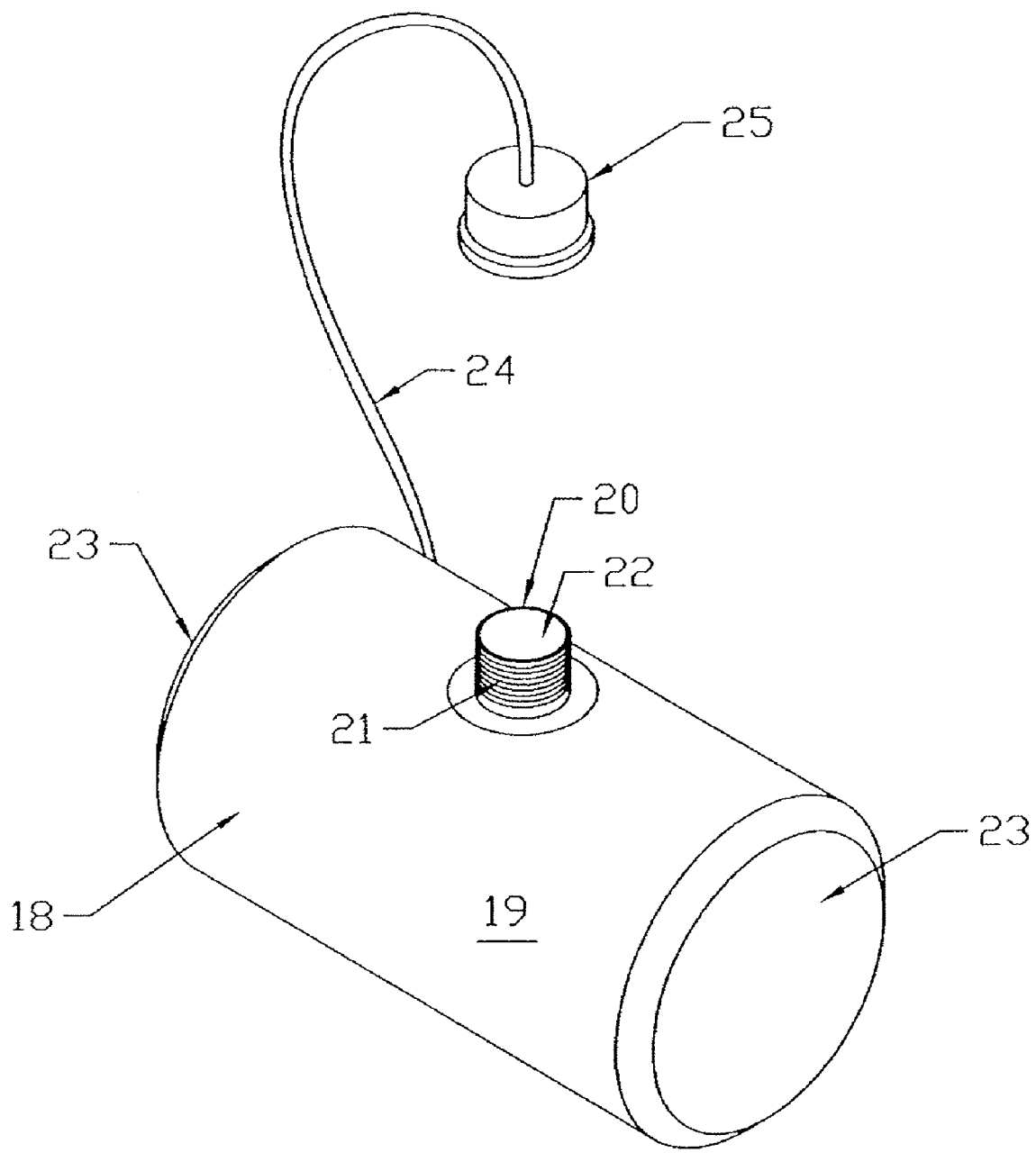
FIG. 3 is a partial perspective view of the preferred embodiment of the apparatus of the present invention showing its use in combination with an alternate fuel tank configuration and with the cap in an open position.
Figure 4:
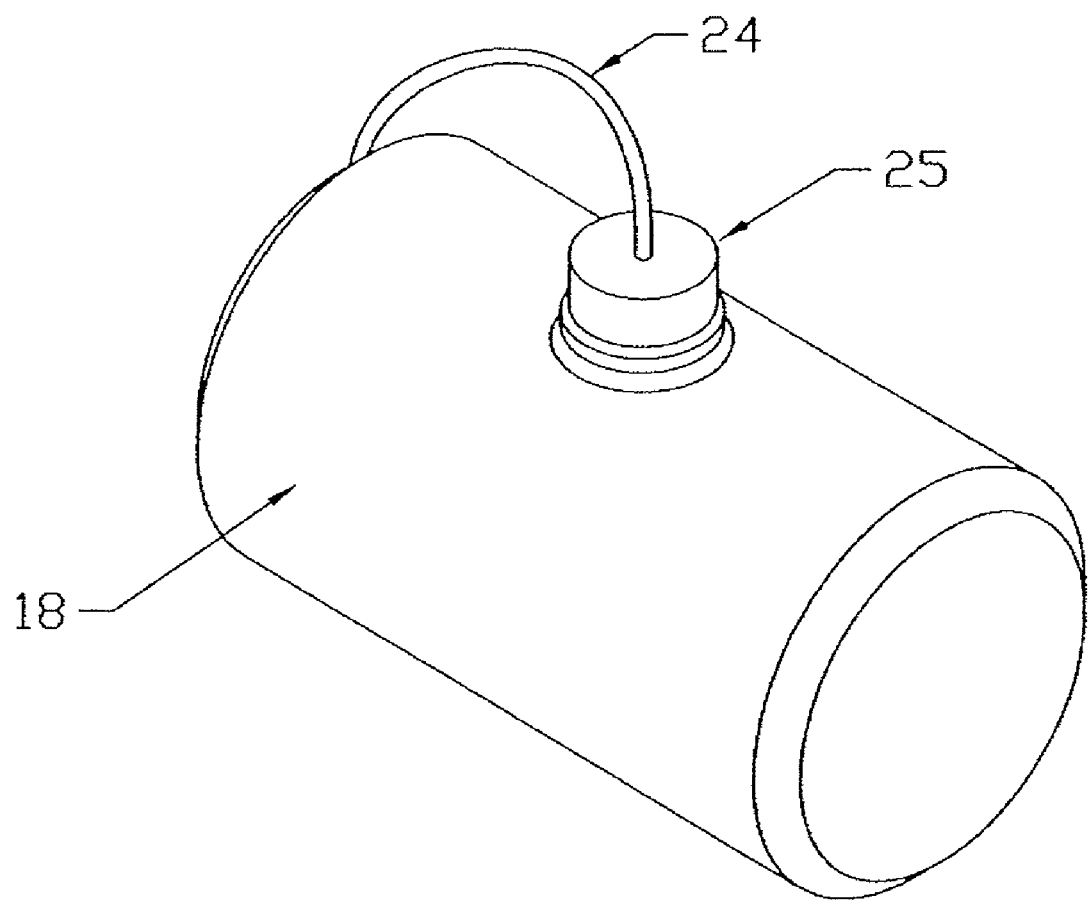
FIG. 4 is a partial perspective view of the preferred embodiment of the apparatus of the present invention showing its use in combination with an alternate fuel tank configuration and with the cap in a closed position.

Such small internal combustion engines 11 can be used to power air compressors, water pumps, pressure washers, go-karts, golf carts, blowers, chipper-shredders, chainsaws, weed trimmers, lawn tractors, lawn mowers, and the like. Such an engine 11 provides an attached fuel tank 12 for containing a fuel product, usually gasoline. Engine 11 produces significant heat and should not be filled with gasoline when it is operating, or is hot from recent operation. As shown in FIG. 1, tank 12 is closely positioned to the engine block of engine 11 and its components that can become very hot during use.

Fuel tank 12 has an upper surface 14 with a cylindrically shaped annular flange 15 having an external thread or threads 16 that engage correspondingly shaped internal thread of a closure cap 25. When cap 25 is attached to cylindrically shaped annular flange 15, fuel filler opening 17 is closed. An alternate fuel tank arrangement 18 is shown on FIGS. 3 and 4 that provides a generally cylindrically shaped fuel tank having cylindrical wall 19 and a pair of opposed circular end walls 23. Opening 22 enables fuel to be added to tank 18. Opening 22 is defined by cylindrically shaped annular flange 20 joined to tank wall 19 and having external thread 21.

In the preferred embodiment, a tether 24 is used to connect between cap 25 and a starter 13 (or an ignition system) that can be for example an electric starter, magnoelectric generator, ignition system or other electronic device known in the art for starting a small internal combustion engine 11 having a fuel tank 12 or 18. Tether 24 is attached at one end portion to cap 25 and provides a negative lead 26 and a positive lead 27 (see FIGS. 5-6). The negative lead 26 connects to ground 28. The positive lead 27 connects to an engine ignition, starter or other electronic device that can disable the engine so that it will not start or run using the apparatus 10 of the present invention.

In every embodiment disclosed herein, a switch disables the ignition system of the engine 11, and preferably prevents the spark plug/plugs from firing by disabling the magnoelectric generator or inductive ignition coil. In doing so, the engine will not run if the cap 25 is loosened or removed. Also, the engine 11 will not run or start even if the starter motor still cycles the engine.

Figure 5:
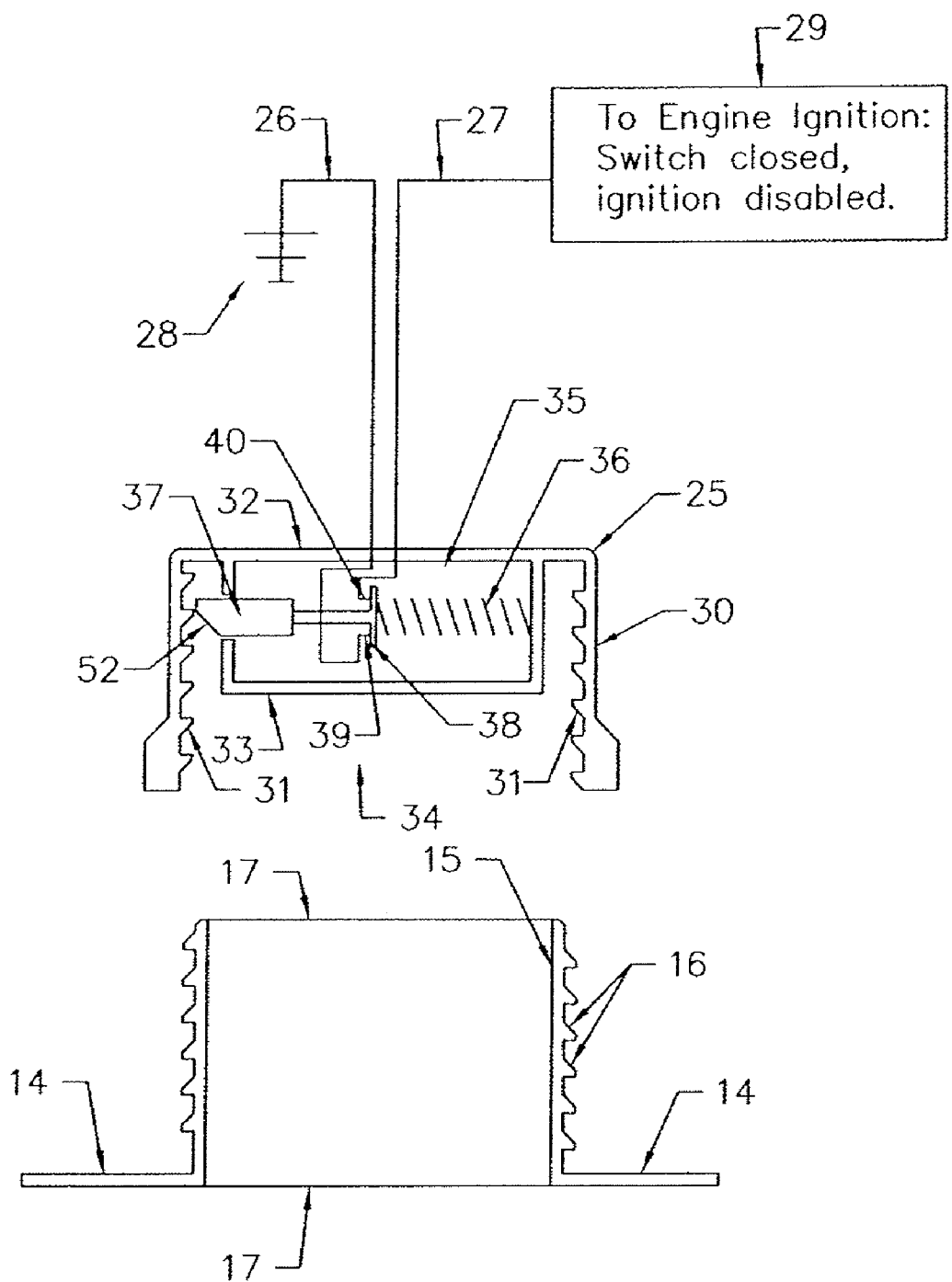
FIG. 5 is a partial sectional elevation view of the preferred embodiment of the apparatus of the present invention illustrating a mechanical switch with plunger arrangement and with the cap in an open position.

In FIG. 5, cap 25 has annular side wall 30 and internal thread 31 that is configured to engage and form a connection with the external threads 16 or 21 of tank 12 or 18. Cap 25 has a circular top wall 32 and has a concavity 34 that contains switch housing 33.

Switch housing 33 has an interior 35 that contains plunger 37 and spring 36 for biasing the plunger 37 to the position shown on FIG. 5. The plunger 37 has contact plate 38 at one end portion for connecting with contacts 39, 40. Contact 39 is a negative contact that forms one end portion of negative lead 26. Contact 40 is a positive contact that forms one end portion of positive lead 27. Plunger 37 can provide a beveled surface 52 that engages cylindrically shaped annular flange 15 when cap 25 is placed upon flange 15 and rotated so that the threads 31 of cap 25 engage the threads 16 or 21 of annular flange 15 as shown on FIGS. 5-6.

Figure 6:
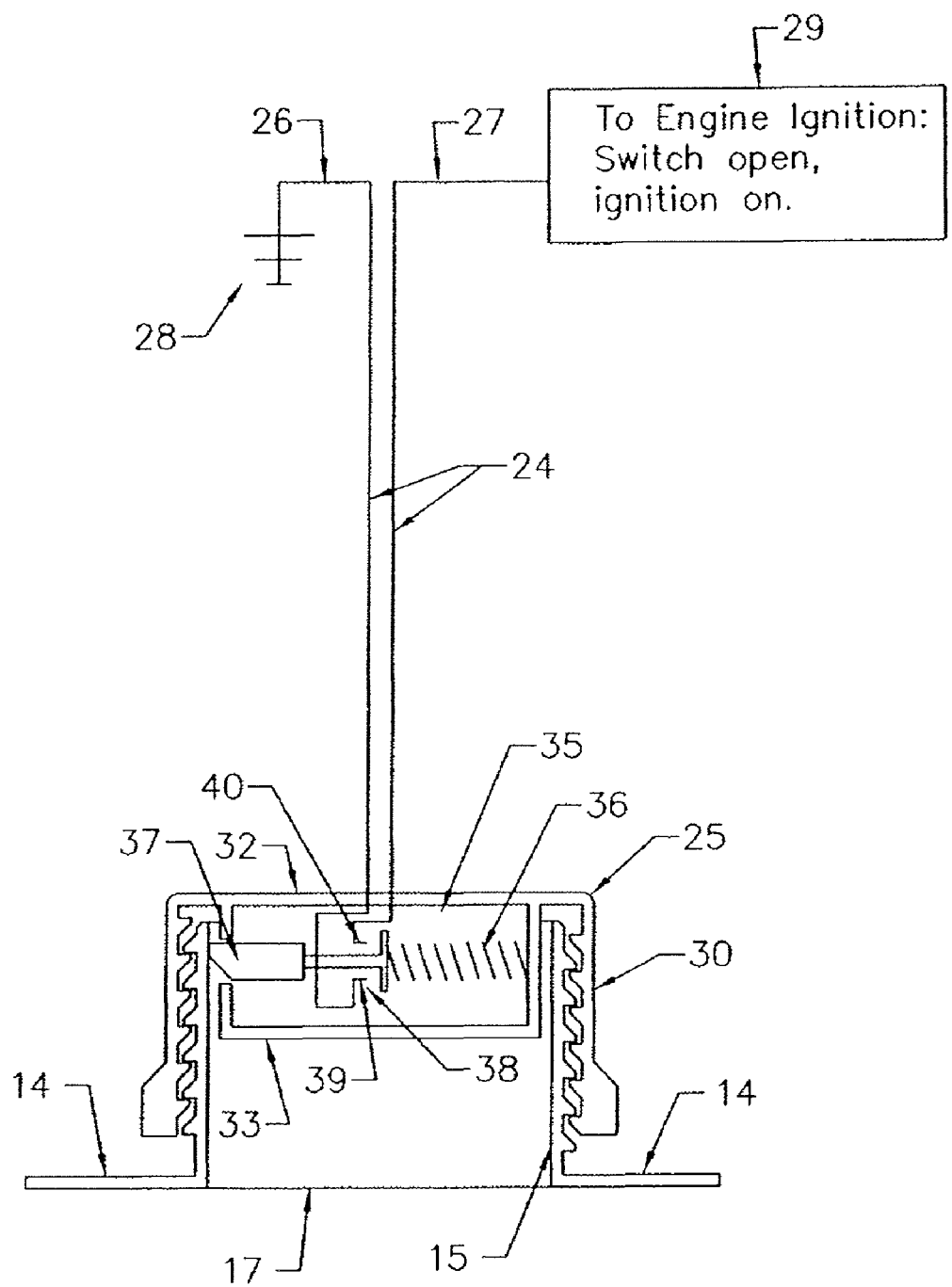
FIG. 6 is a partial sectional elevation view of the preferred embodiment of the apparatus of the present invention illustrating a mechanical switch with plunger arrangement and with the cap in a closed position.

In FIG. 6, the plunger 37 is shown engaging the cylindrically shaped annular flange 15 which moves the contact plate 38 away from contacts 39, 40, a wiring configuration that enables the engine to be started. In FIG. 5, when the cap 25 is separated from cylindrically shaped annular flange 15, contact lead 38 engages contacts 39, 40 which results in an ignition switch being closed and the engine ignition (or starter 13) being disabled. This arrangement disables the ignition system of the engine, and preferably prevents the spark plug/plugs from firing by disabling the magnoelectric generator or inductive ignition coil. In doing so, the engine 11 would stop running if the cap 25 loosened or was removed. Also, the engine 11 would not run or start even if the starter motor 13 still cycles the engine.

Figure 7:
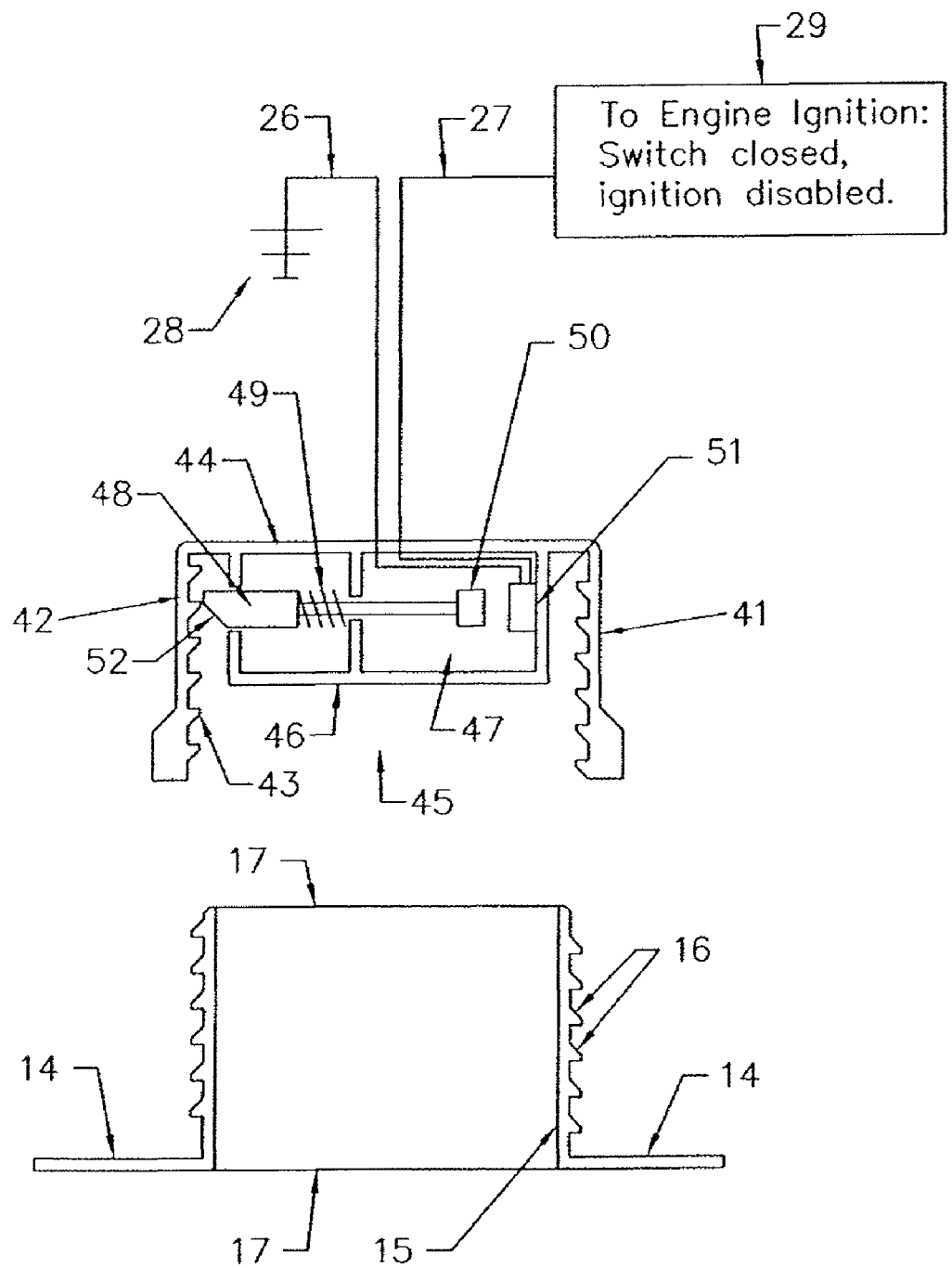
FIG. 7 is a partial sectional elevation view of the preferred embodiment of the apparatus of the present invention illustrating a reed switch with plunger arrangement and with the cap in an open position.
Figure 8:
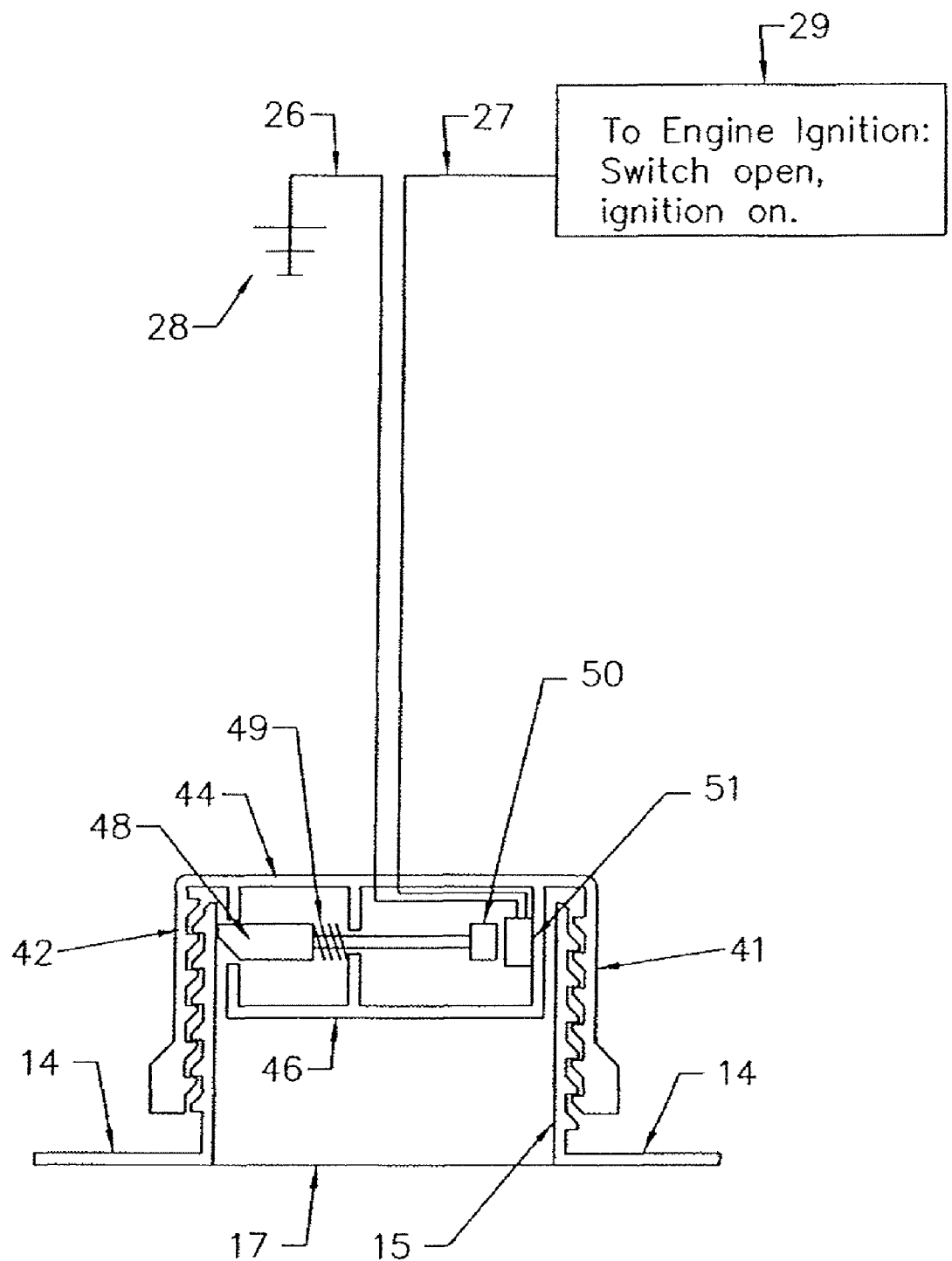
FIG. 8 is a partial sectional elevation view of the preferred embodiment of the apparatus of the present invention illustrating a reed switch with plunger arrangement and with the cap in a closed position.

An alternate construction shown in FIGS. 7 and 8 wherein cap 41 has an annular side wall 42 with internal thread 43 that engages the thread 16 or 21 of a tank 12 or 18. The closed position is shown in FIG. 8. Cap 41 has circular top wall 44 and provides a concavity 45 that contains switch housing 46. Switch housing 46 has an interior 47 that contains plunger 48. Spring 49 urges plunger 48 to the position shown in FIG. 7. In FIG. 7, the engine ignition is disabled as magnet 50 is spaced away from reed switch 51. In FIG. 8, beveled surface 52 of plunger 48 has engaged cylindrically shaped annular wall 15 depressing spring 49 as shown, contacting magnet 50 with reed switch 51 permitting the ignition to be activated.

Figure 9:
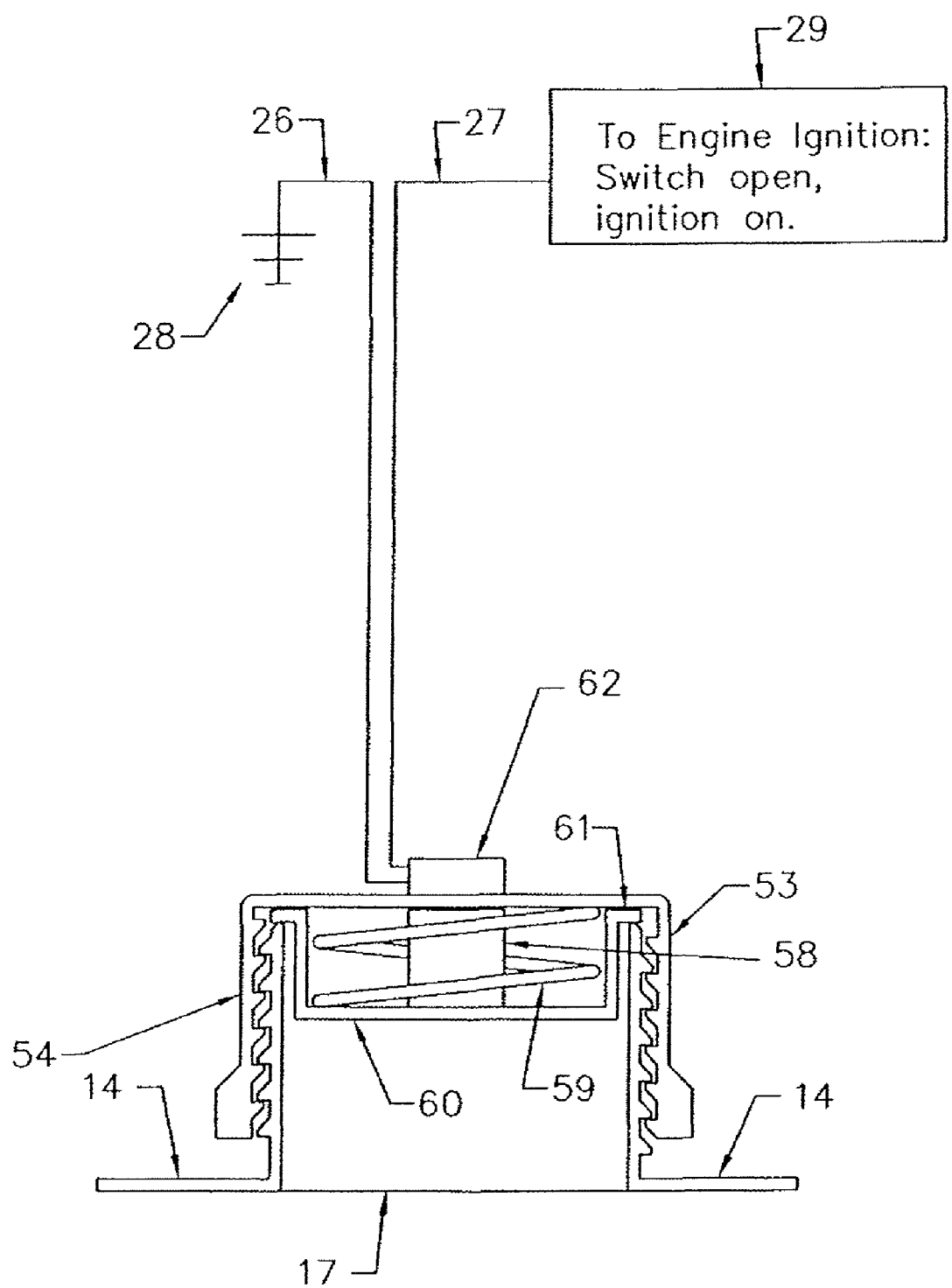
FIG. 9 is a sectional elevation view of the preferred embodiment of the apparatus of the present invention showing an alternate reed switch arrangement and with the cap in a closed position.
Figure 10:
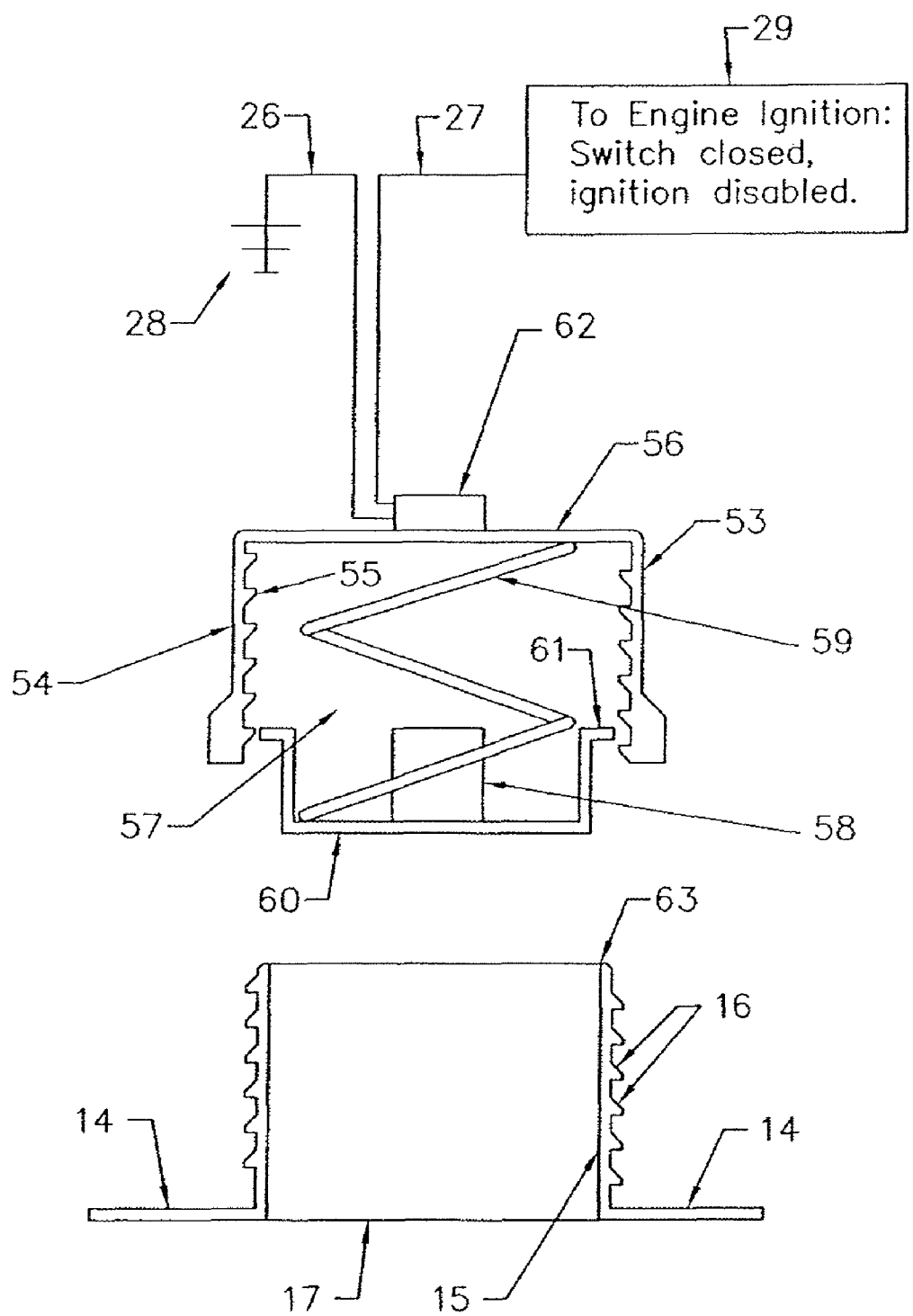
FIG. 10 is a sectional elevation view of the preferred embodiment of the apparatus of the present invention showing an alternate reed switch arrangement and with the cap in an open position.

FIGS. 9 and 10 show cap 53 having annular side wall 54 with internal thread 55. Cap 53 has circular top wall 56 and provides a concavity 57 that is receptive of magnet 58 and spring 59. Spring 59 is attached to and supports follower plate 60. Plate 60 has an annular shoulder 61 that engages the top of cylindrically shaped annular flange 15 at position 63 as shown in FIGS. 9 and 10 when cap 53 is an a closed position. As cap 53 is tightened while engaging threads 55 with threads 16 or 21, follower plate 60 and magnet 58 travel to the position shown in FIG. 9 and places magnet 58 next to reed switch 62. In this position, engine ignition is permitted. In FIG. 10, magnet 58 and reed switch 62 are spaced apart so that ignition is disabled.

Figure 11:
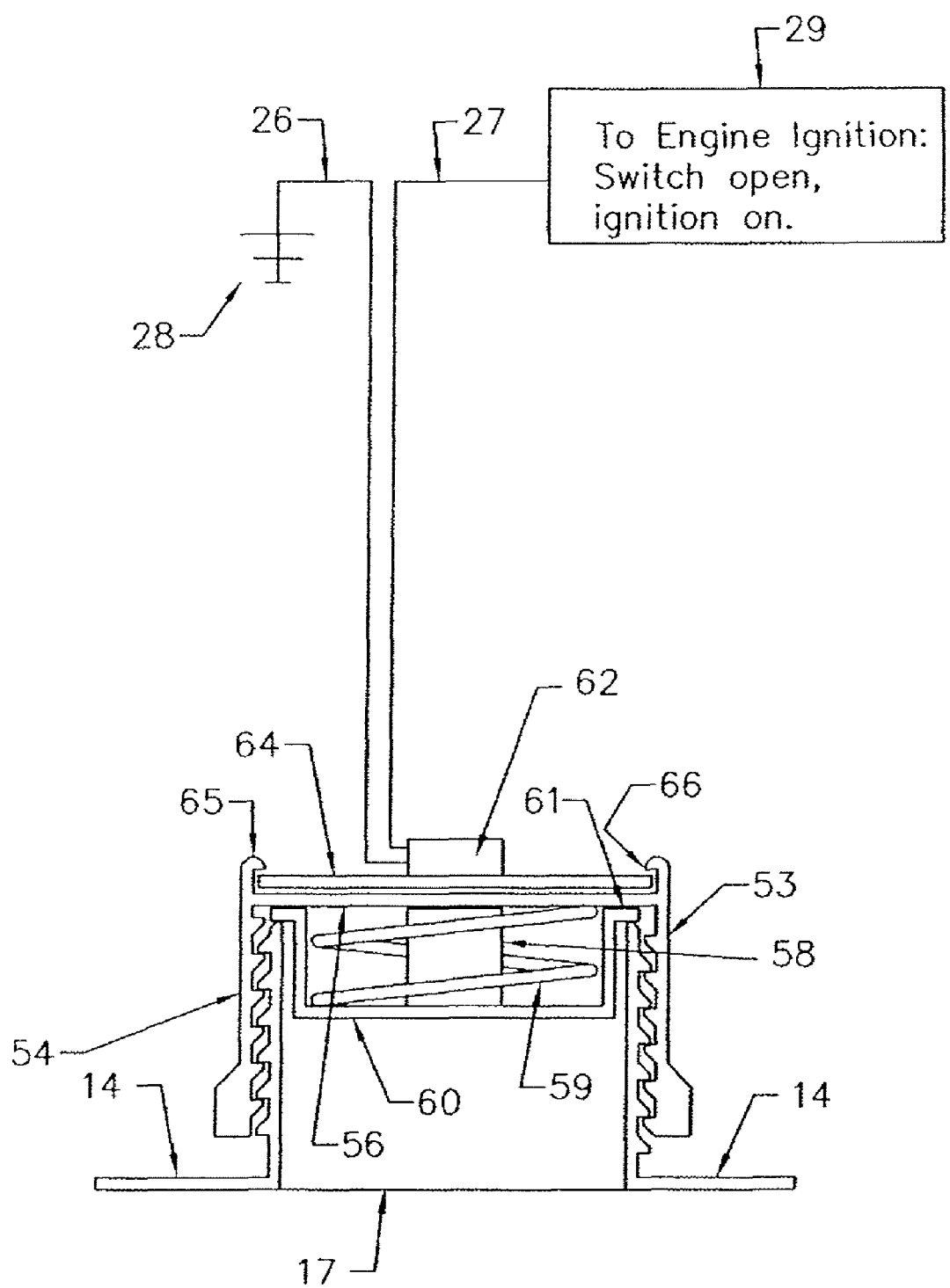
FIG. 11 is a sectional elevation view of the preferred embodiment of the apparatus of the present invention showing an external reed switch with swivel and with the cap in a closed position.
Figure 12:
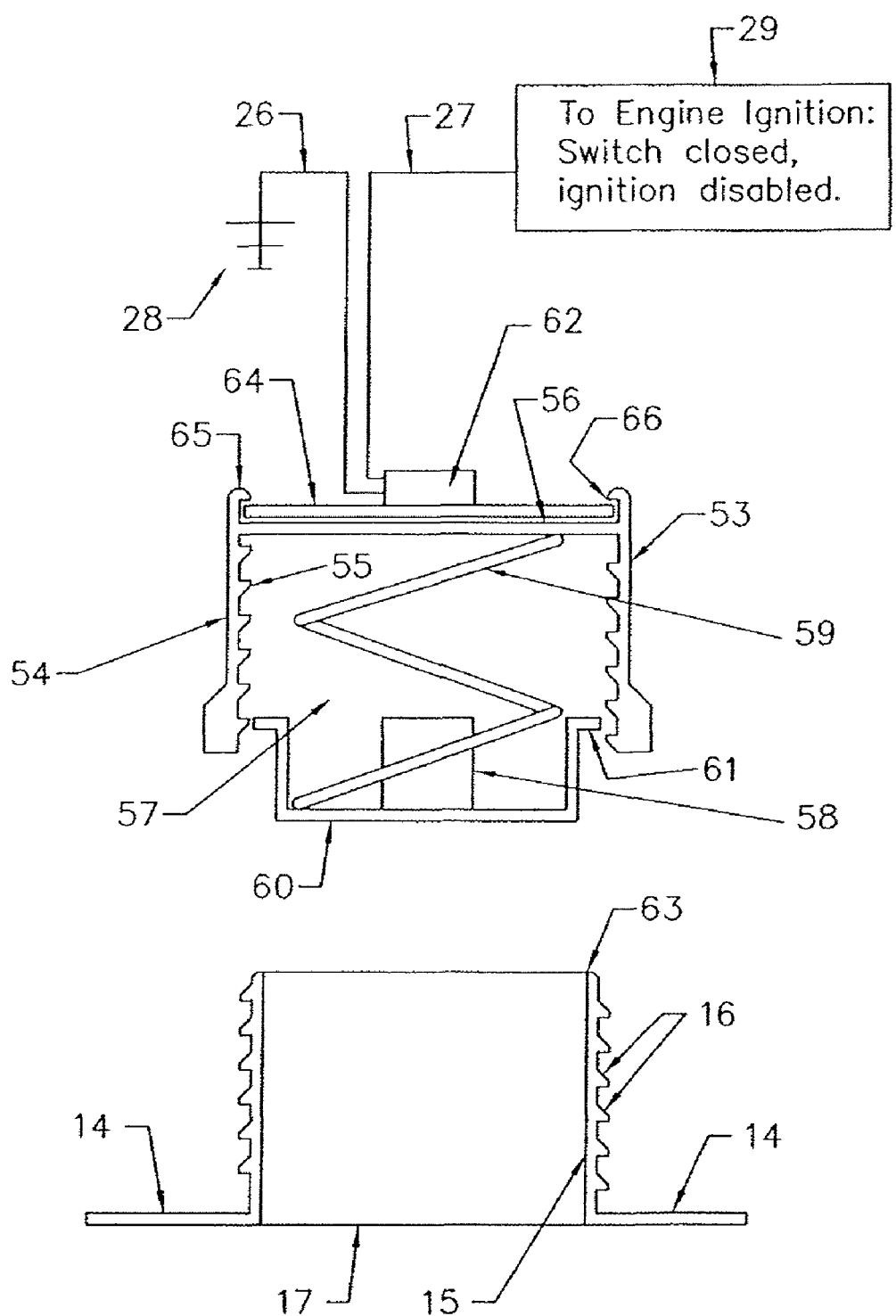
FIG. 12 is a sectional elevation view of the preferred embodiment of the apparatus of the present invention showing an external reed switch with swivel and with the cap in an open position.

FIGS. 11 and 12 show an alternate construction for cap 53 wherein the reed switch 62 has a swivel mount. Switch 62 is attached to circular plate 64 that is positioned on the top of top wall 56 and held there by a peripheral indented retainer having shoulder 65 and annular groove 66.

Figure 13:
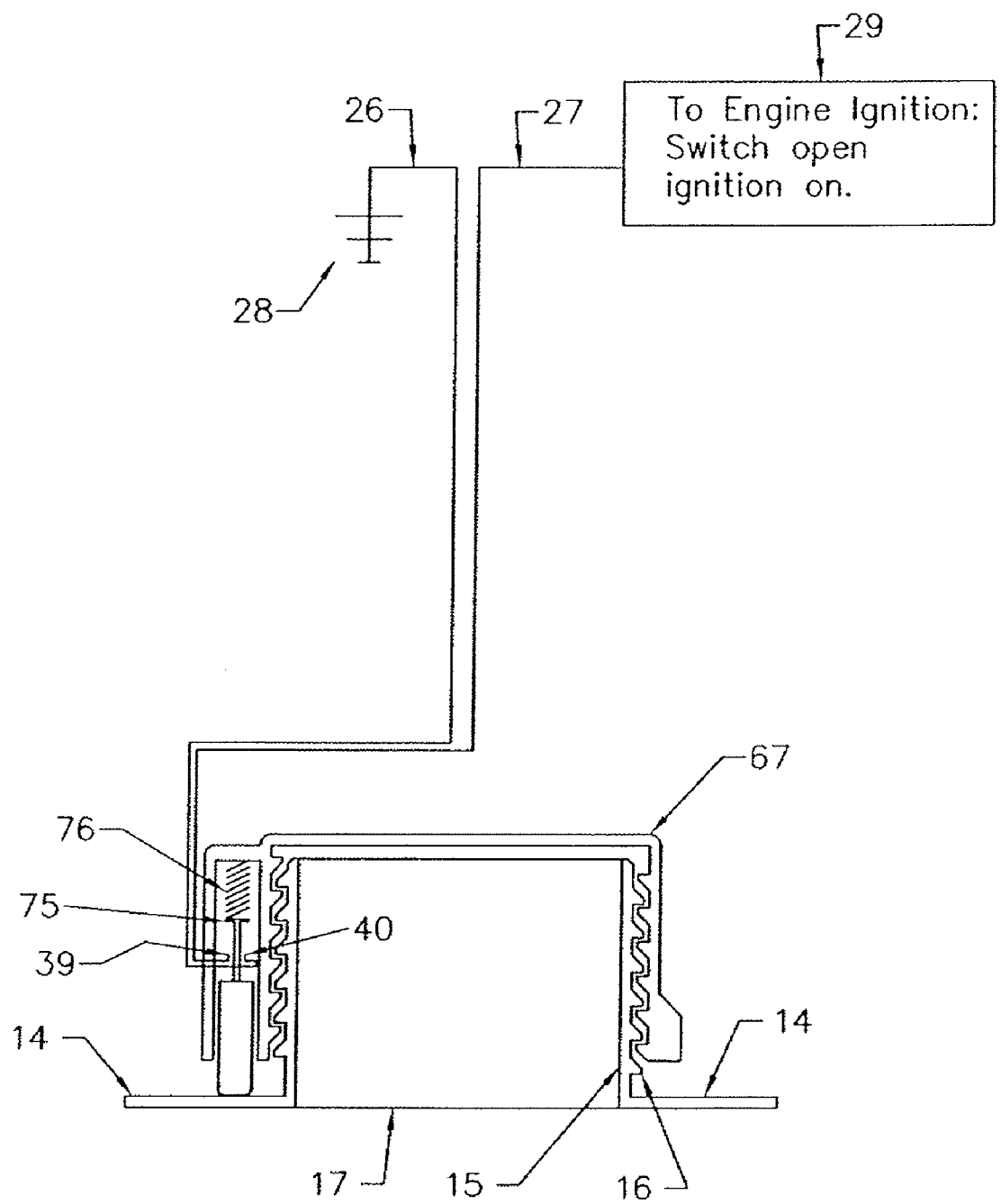
FIG. 13 is a partial sectional elevation view of the preferred embodiment of the apparatus of the present invention illustrating an external mechanical switch with plunger arrangement and with the cap in a closed position.
Figure 14:
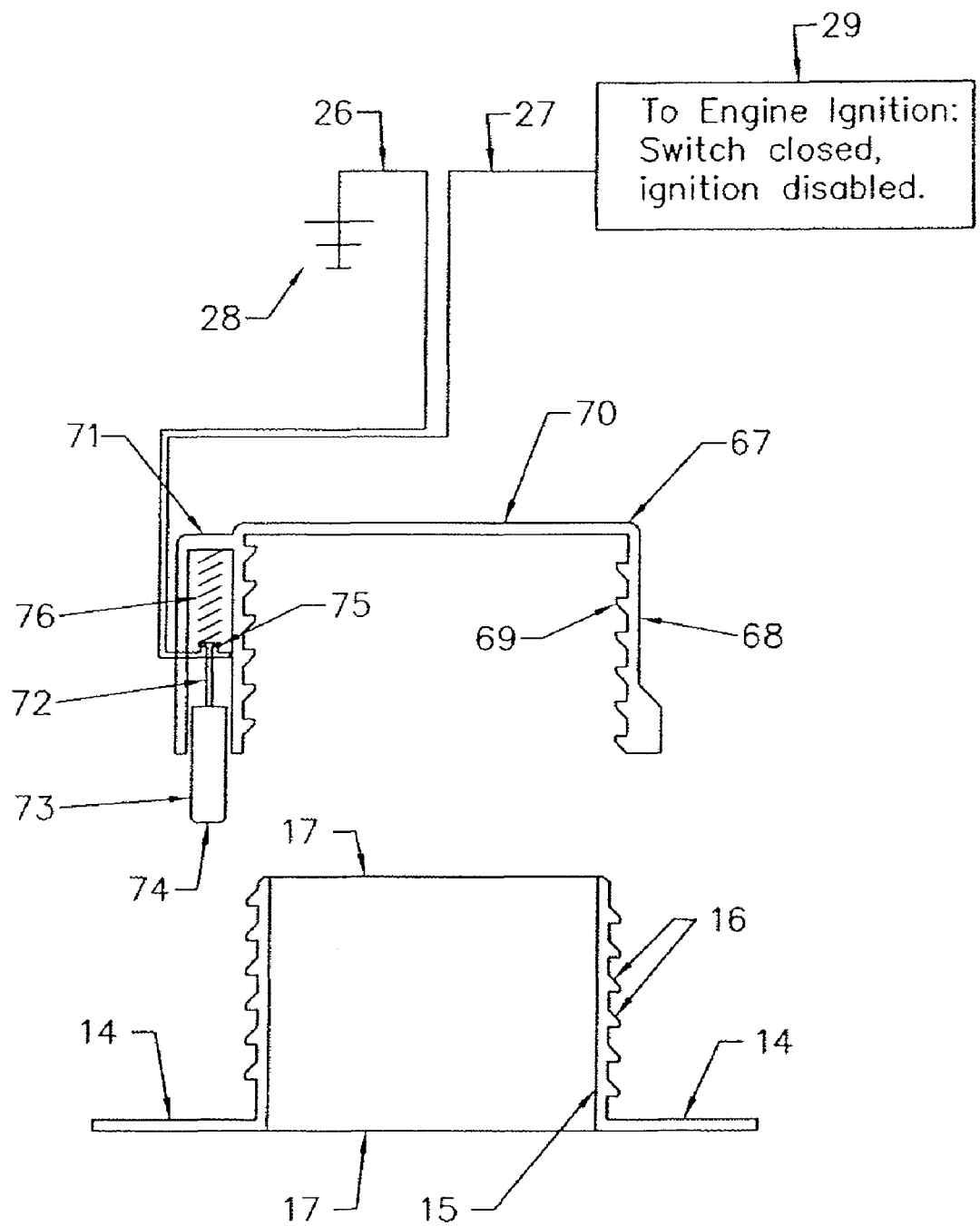
FIG. 14 is a partial sectional elevation view of the preferred embodiment of the apparatus of the present invention illustrating an external mechanical switch with plunger arrangement and with the cap in an open position.

FIGS. 13 and 14 show an external mechanical switch arrangement provided by cap 67. Cap 67 has cylindrical side wall 68 with internal thread 69 for engaging and forming a closure with the thread 16 of cylindrically shaped annular flange 15. Cap 67 provides a circular top 70. An external switch housing 71 is attached to cylindrically shaped side wall 68 as shown in FIGS. 13 and 14.

External switch housing 71 has an interior 72 containing push rod 73. Push rod 73 has an end portion 74 that engages fuel tank 12 upper surface 14 when the cap 67 is threaded upon and connected to cylindrically shaped flange 15. Once the cap 67 is threadably engaged with annular flange 15 as shown in FIG. 13, end portion 74 of push rod 73 is depressed as it engages surface 14. This action compresses spring 76 and spaces contact plate 75 from contacts 39, 40. In that position shown in FIG. 13, the engine ignition switch is open and ignition can be activated to start the engine. In FIG. 14, the contact plate 75 engages the contacts 39, 40 to close the switch and disable the ignition. When the cap 67 is removed, spring 76 urges the contact plate 75 into engagement with the two contacts 39, 40 as shown in FIG. 14 and the ignition is disabled so that the engine 11 will not start or run.

Figure 15:
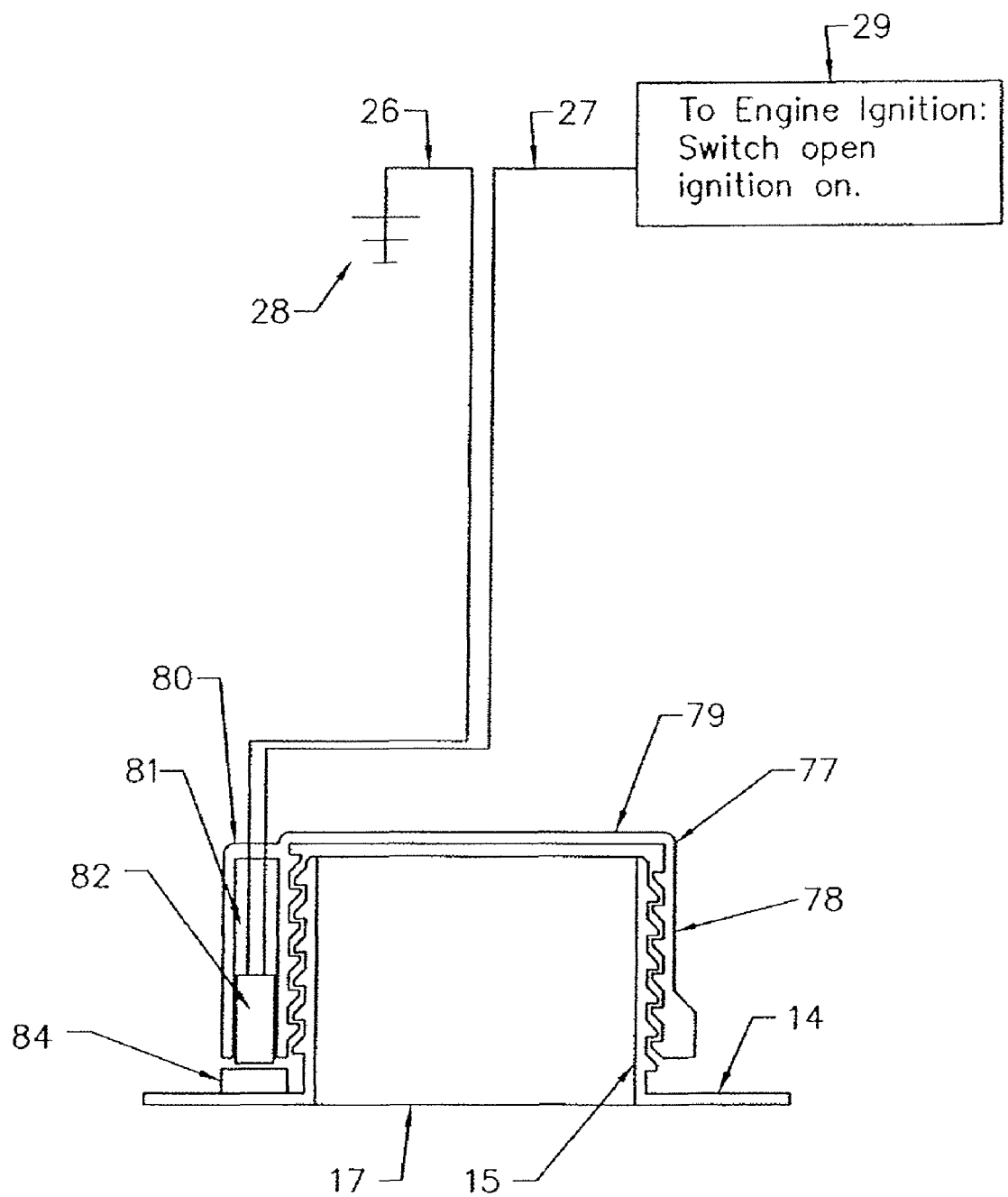
FIG. 15 is a partial sectional elevation view of the preferred embodiment of the apparatus of the present invention illustrating an external reed switch with plunger arrangement and with the cap in a closed position.
Figure 16:
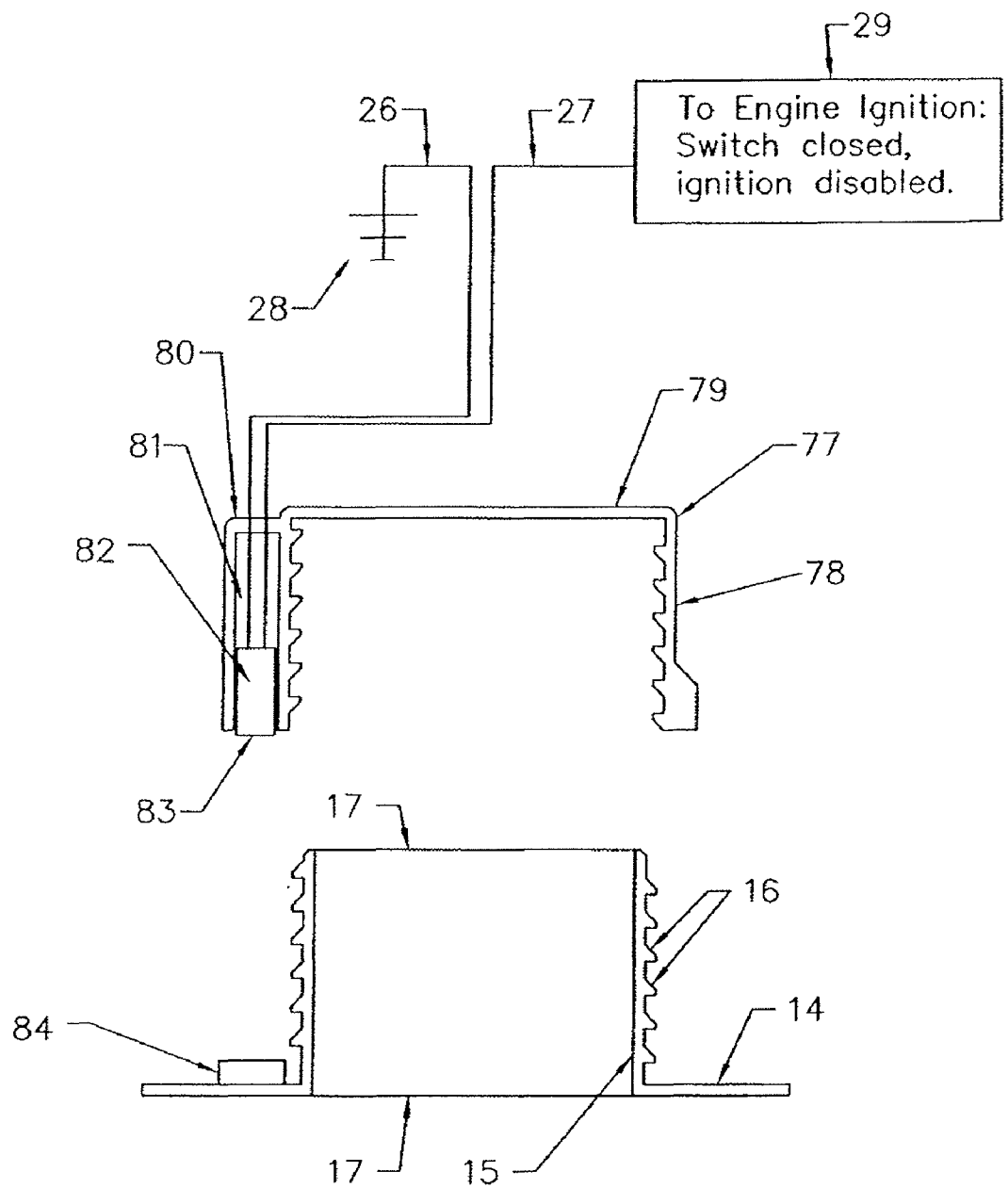
FIG. 16 is a partial sectional elevation view of the preferred embodiment of the apparatus of the present invention illustrating an external reed switch with plunger arrangement and with the cap in an open position.

FIGS. 15 and 16 show a cap 77 having a cylindrically shaped side wall 78, circular top 79, and an external switch housing 80 mounted to cylindrical side wall 78. External switch housing 80 has an interior 81 carrying a reed switch 82. Reed switch 82 provides end portion 83. When the cap 77 is in the closed position shown in FIG. 15, reed switch 82 and magnet 84 are in close proximity allowing engine 11 ignition. In FIG. 16, the magnet 84 and reed switch 82, end portion 83 are spaced apart and ignition is disabled.

This arrangement of FIGS. 15 and 16 disables the ignition system of the engine, and preferably prevents the spark plug/ plugs from firing by disabling the magnoelectric generator or inductive ignition coil. In doing so, the engine would stop running if the cap loosened or was removed. Also, the engine 11 would not run or start even if the starter motor still turns the engine over.

Figure 17:
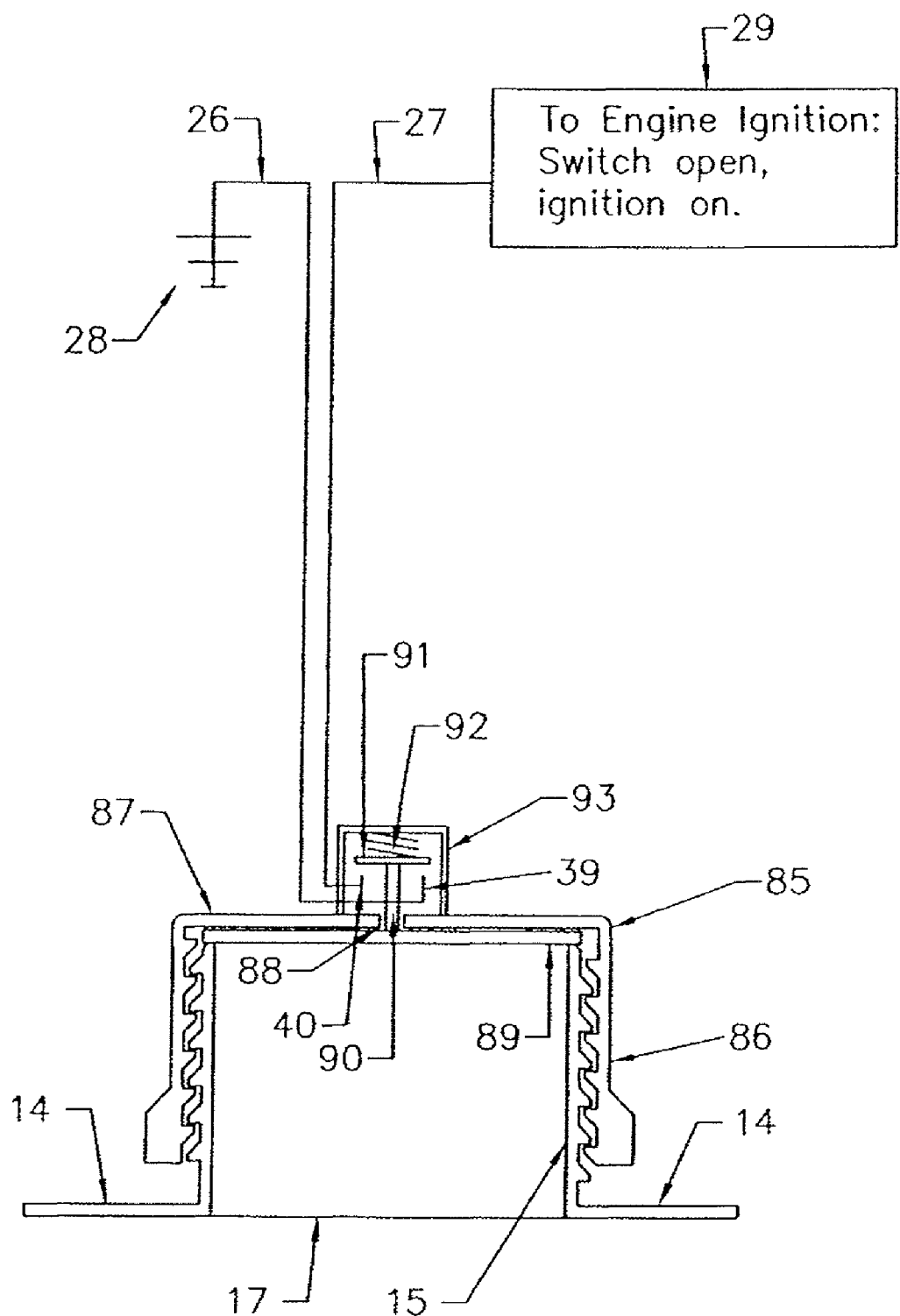
FIG. 17 is a partial sectional elevation view of the preferred embodiment of the apparatus of the present invention illustrating an external mechanical switch with a centered, spring loaded plunger arrangement and with the cap in a closed position.
Figure 18:
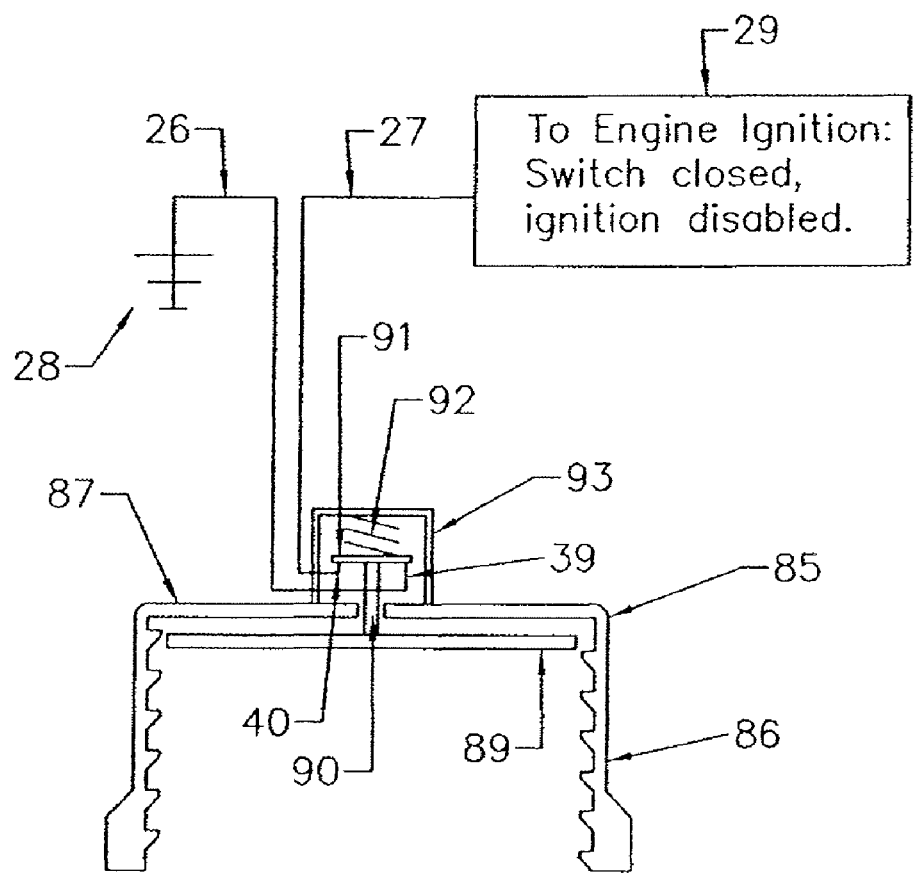
FIG. 18 is a partial sectional elevation view of the preferred embodiment of the apparatus of the present invention illustrating an external mechanical switch with a centered, spring loaded plunger arrangement and with the cap in a open position.
Figure 18:
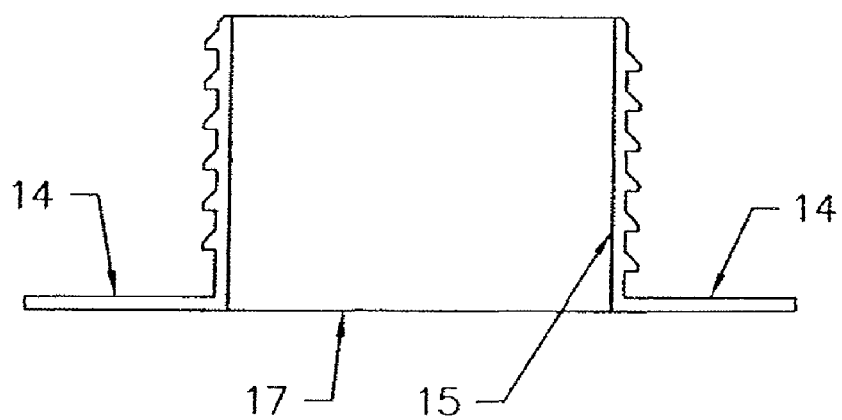

In FIGS. 17-18, another cap arrangement is shown. Cap 85 in FIGS. 17-18 has a cylindrically shaped side wall 86, circular top 87 and a central opening 88 through circular top 87. Switch housing 93 is mounted to the upper surface of circular top 87 above central opening 88. Connecting rod 90 extends through opening 88 and supports at its upper end portion contact plate 91. At its lower end portion, connecting rod 90 is connected to disk 89. Spring 92 pushes contact plate 91 toward contacts 39, 40. In a closed position of cap 85 (FIG. 17), the contact plate 91 engages the upper edge of cylindrically shaped flange 15 spacing contact plate 91 from contacts 39, 40. In this switch open position of FIG. 17, engine ignition is allowed. If the cap 85 were removed from annular flange 15 (FIG. 18), spring 92 pushes contact plate 91 into contacts 39, 40 and engine ignition is disallowed.

Figure 19:
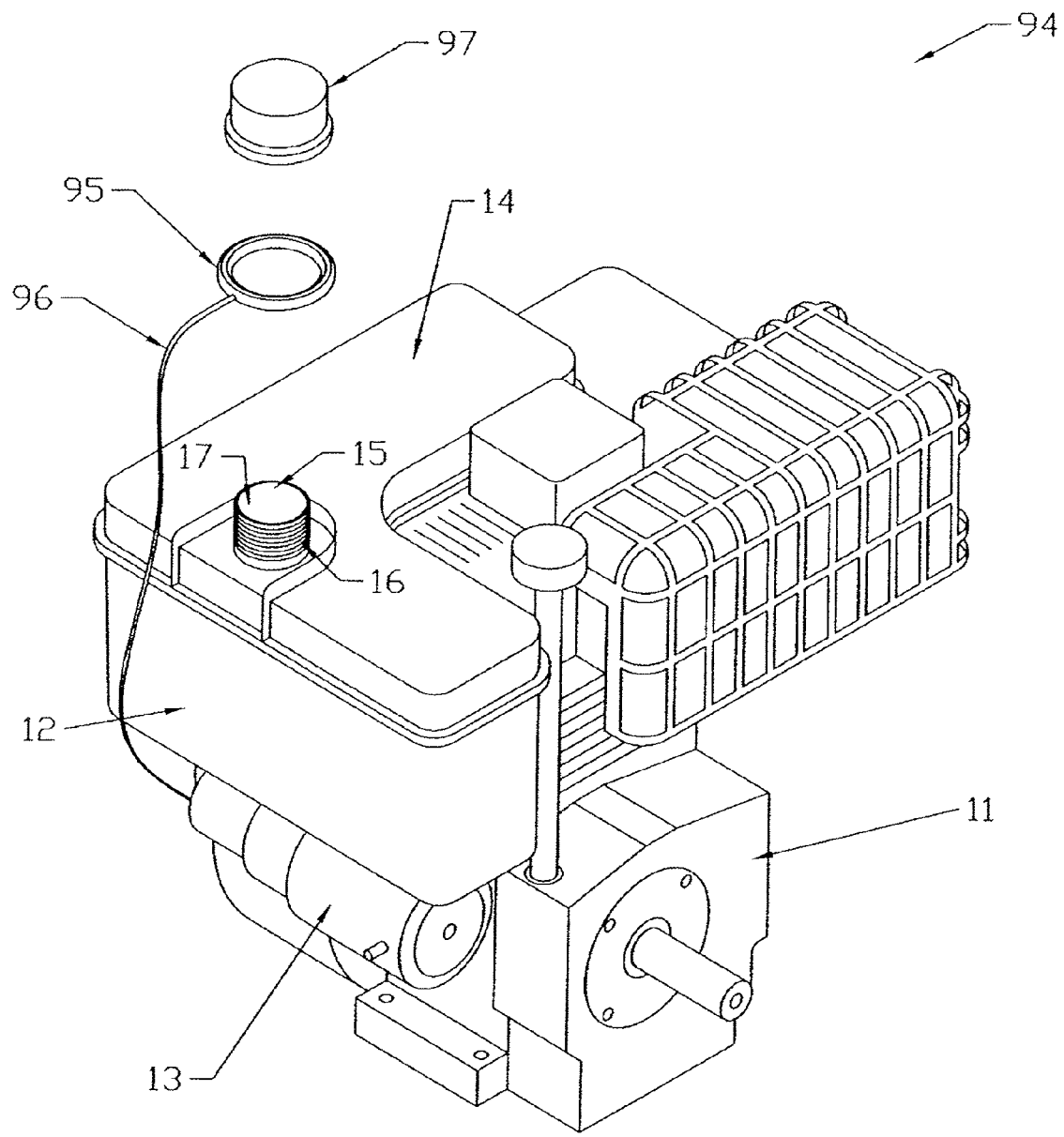
FIG. 19 is a perspective view of an alternate embodiment of the apparatus of the present invention showing the fuel filler cap in an open position.
Figure 20:
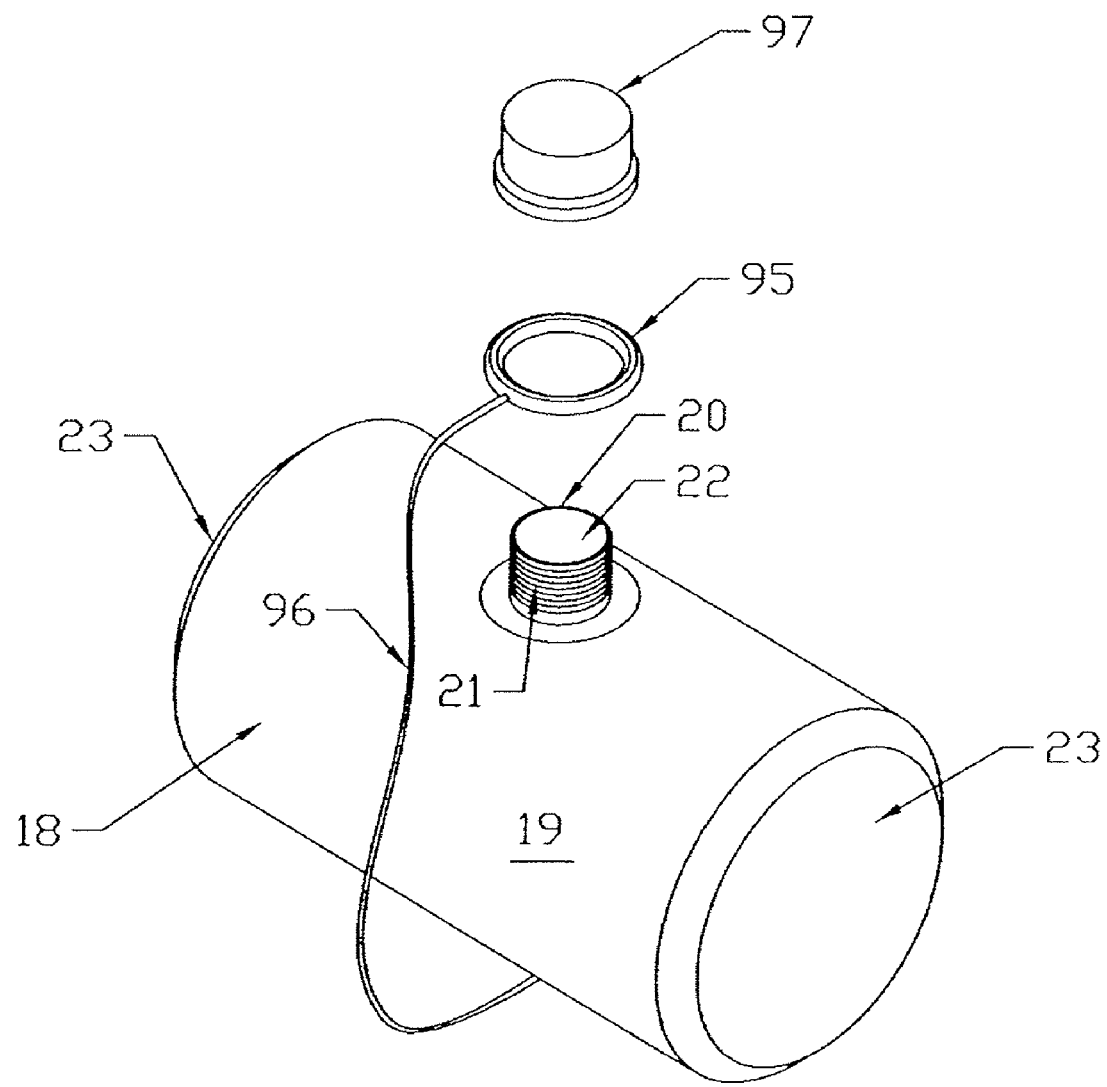
FIG. 20 is a perspective view of the alternate embodiment of the apparatus of the present invention showing the fuel filler cap in a open position and with an alternate tank configuration.

FIGS. 19, 20, 21, 22, 23, 24 and 25 disclose an alternate safety fuel tank and cap apparatus 94 that employs an enclosed circular contact switch 95. The enclosed circular switch 95 is connected with tether 96 to an engine starter 13 or other ignition. In FIGS. 19 and 20, cap 97 is simply a conventional fuel cap that has a cylindrically shaped side wall 98, circular top 99, internal thread 100, and a concavity 101 that receives cylindrically shaped annular flange 15 in a closed position of FIGS. 21 and 23.

The enclosed circular contact switch 95 is compressed by the engagement of cap 97 internal threads 100 with the external thread 16 of cylindrically shaped annular flange 15. In the closed position of FIG. 21, annular edge 102 of cylindrically shaped side wall 98 of cap 97 presses against and compresses envelope 105 (rubber, polymeric, etc.). As the envelope 105 is compressed, an upper contact ring 103 is moved toward and contacts a lower contact ring 104. This closed position of the cap 97 can be seen in FIGS. 21 and 23.

Figure 21:
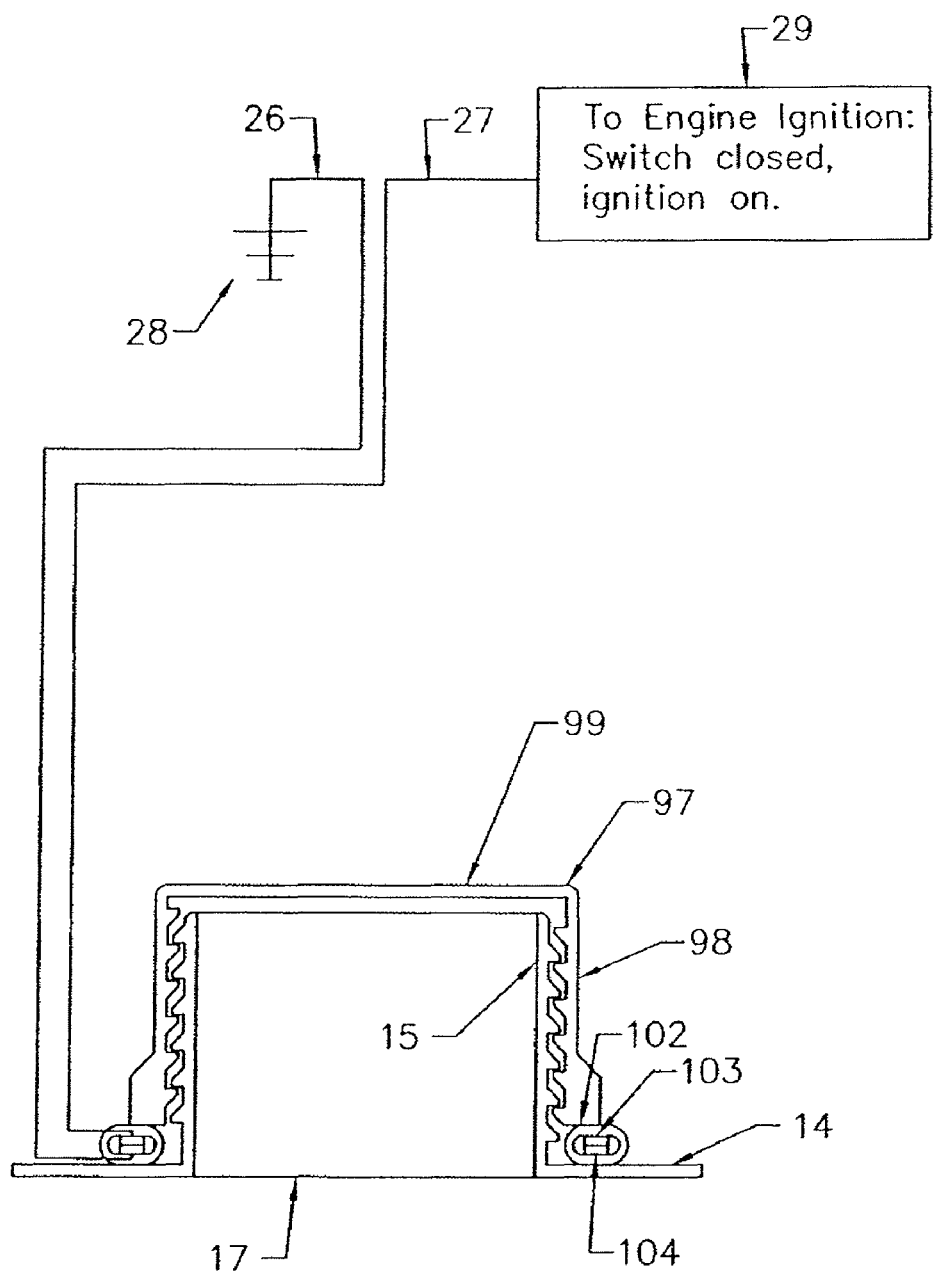
FIG. 21 is a partial sectional elevation view of the preferred embodiment of the apparatus of the present invention illustrating an enclosed circular contact switch and with the cap in a closed position.
Figure 22:
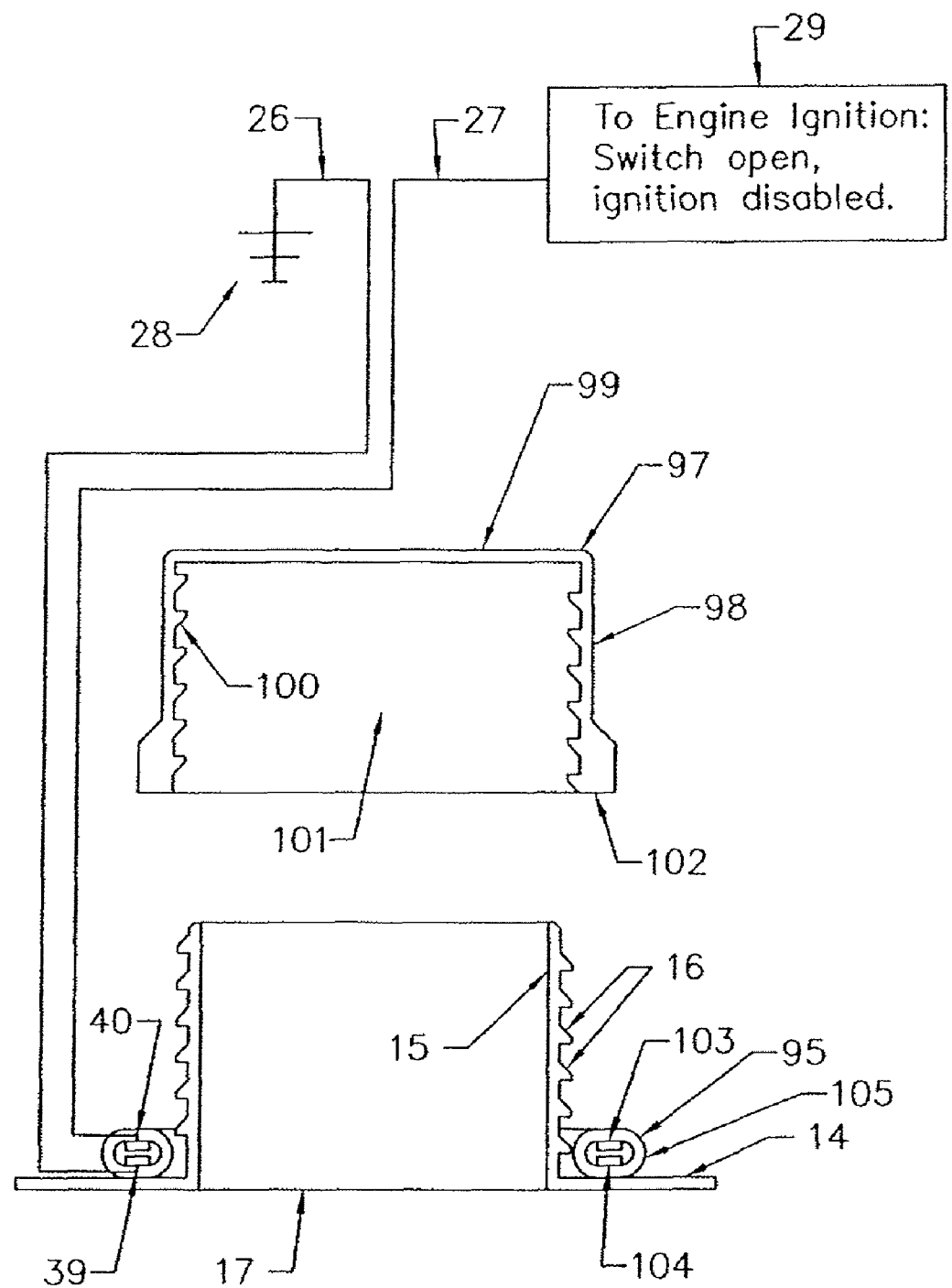
FIG. 22 is a partial sectional elevation view of the preferred embodiment of the apparatus of the present invention illustrating an enclosed circular contact switch and with the cap in an open position.
Figure 23:
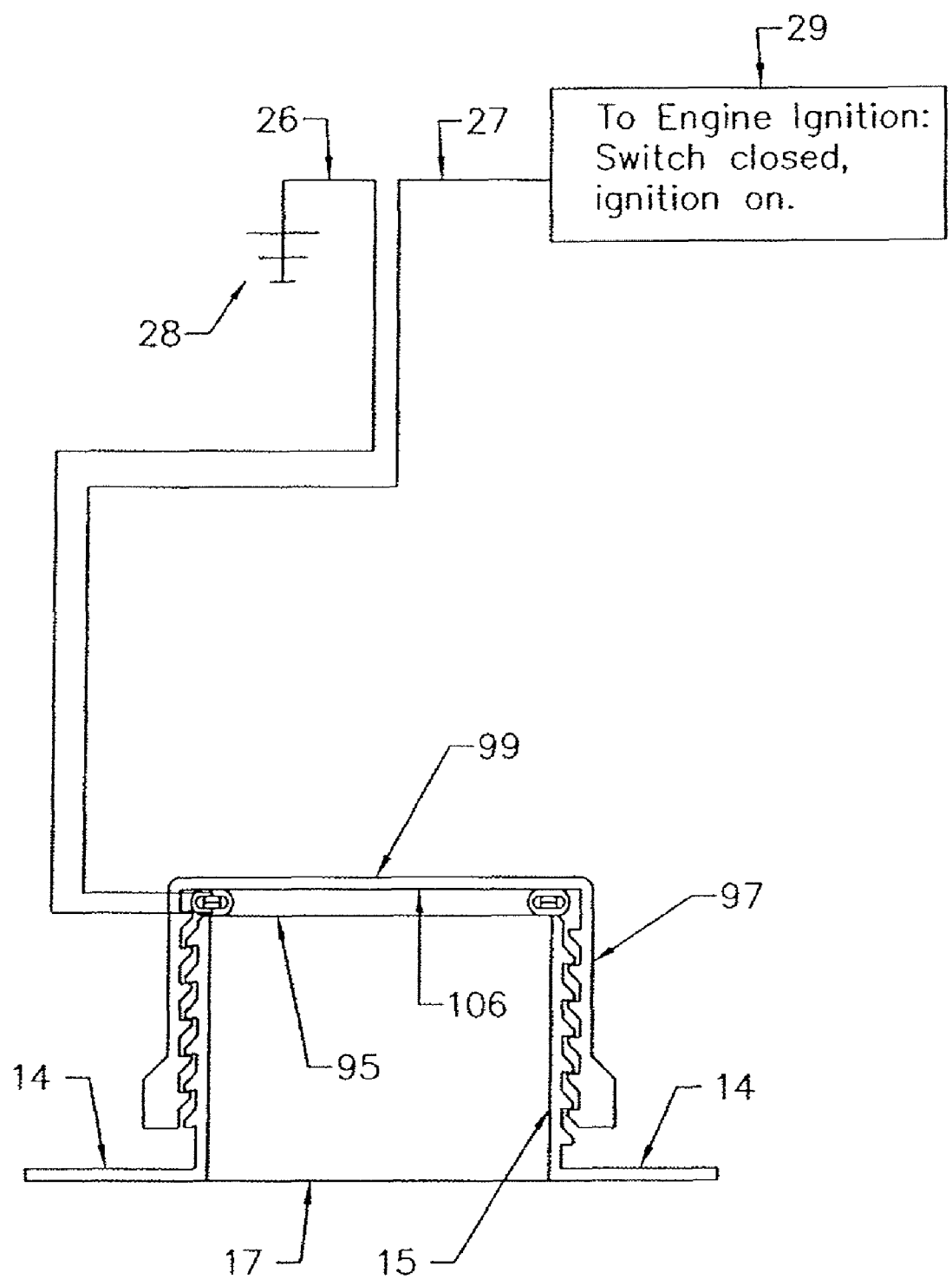
FIG. 23 is a partial sectional elevation view of the preferred embodiment of the apparatus of the present invention illustrating another enclosed circular contact switch and with the cap in a closed position.
Figure 24:
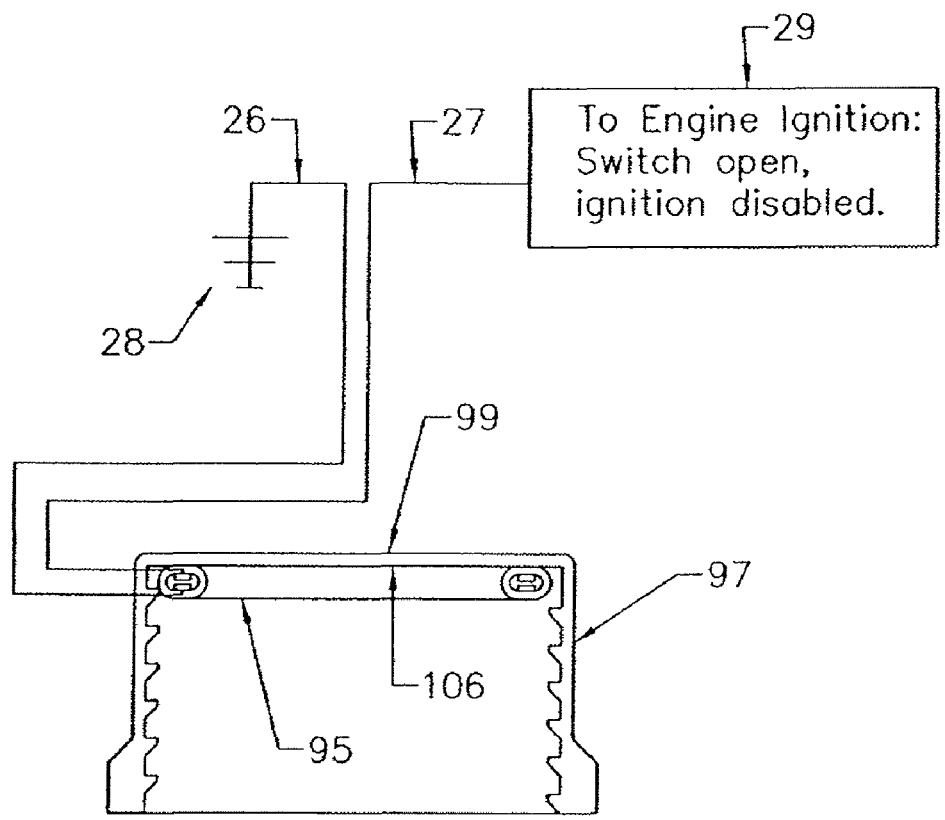
FIG. 24 is a partial sectional elevation view of the preferred embodiment of the apparatus of the present invention illustrating another enclosed circular contact switch and with the cap in an open position.
Figure 24:
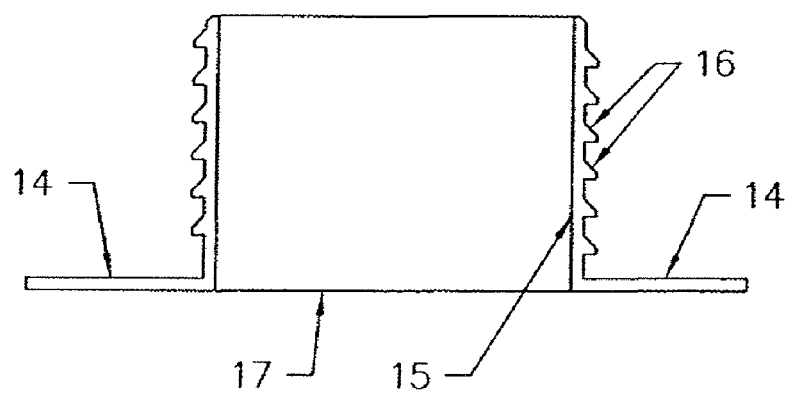

In FIG. 21, the ring 95 is positioned in between upper surface 14 of tank 12 and annular edge 102. In FIG. 23, enclosed circular contact switch 95 is sandwiched between cap 97 circular top 99 and cylindrically shaped annular flange 15. In FIGS. 23 and 24, enclosed circular contact switch 95 can be attached to or adhered to underside 106 of circular top 99 of cap 97.

In FIGS. 26-29, a cap 107 is disclosed that has contacts that engage a conductive ring. The cap 117 of FIGS. 28 and 29 similarly provides a combination of contacts and a conductive ring.

Figure 25:
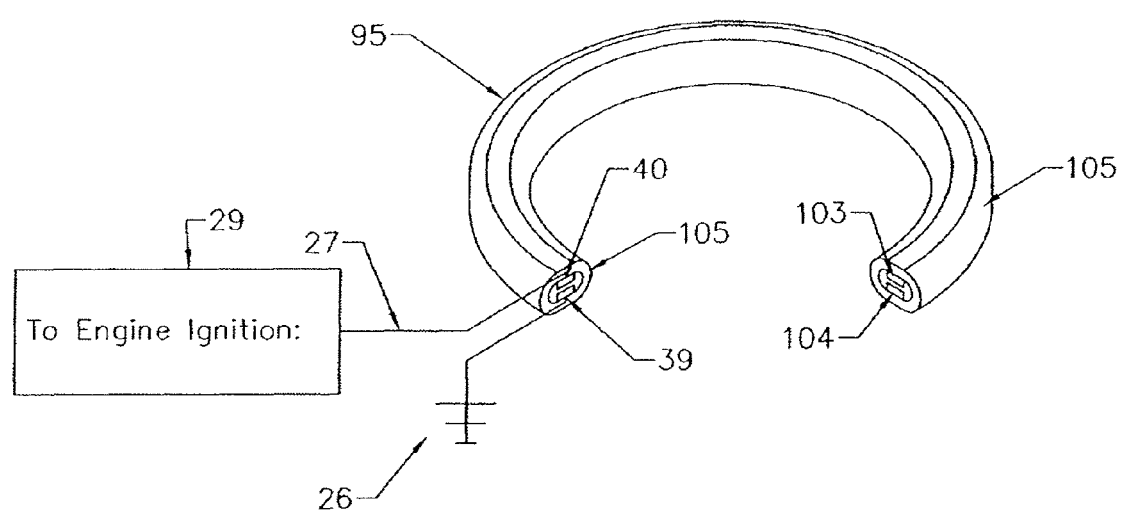
FIG. 25 is a fragmentary view of the preferred embodiment of the apparatus of the present invention illustrating an enclosed circular contact switch.
Figure 26:
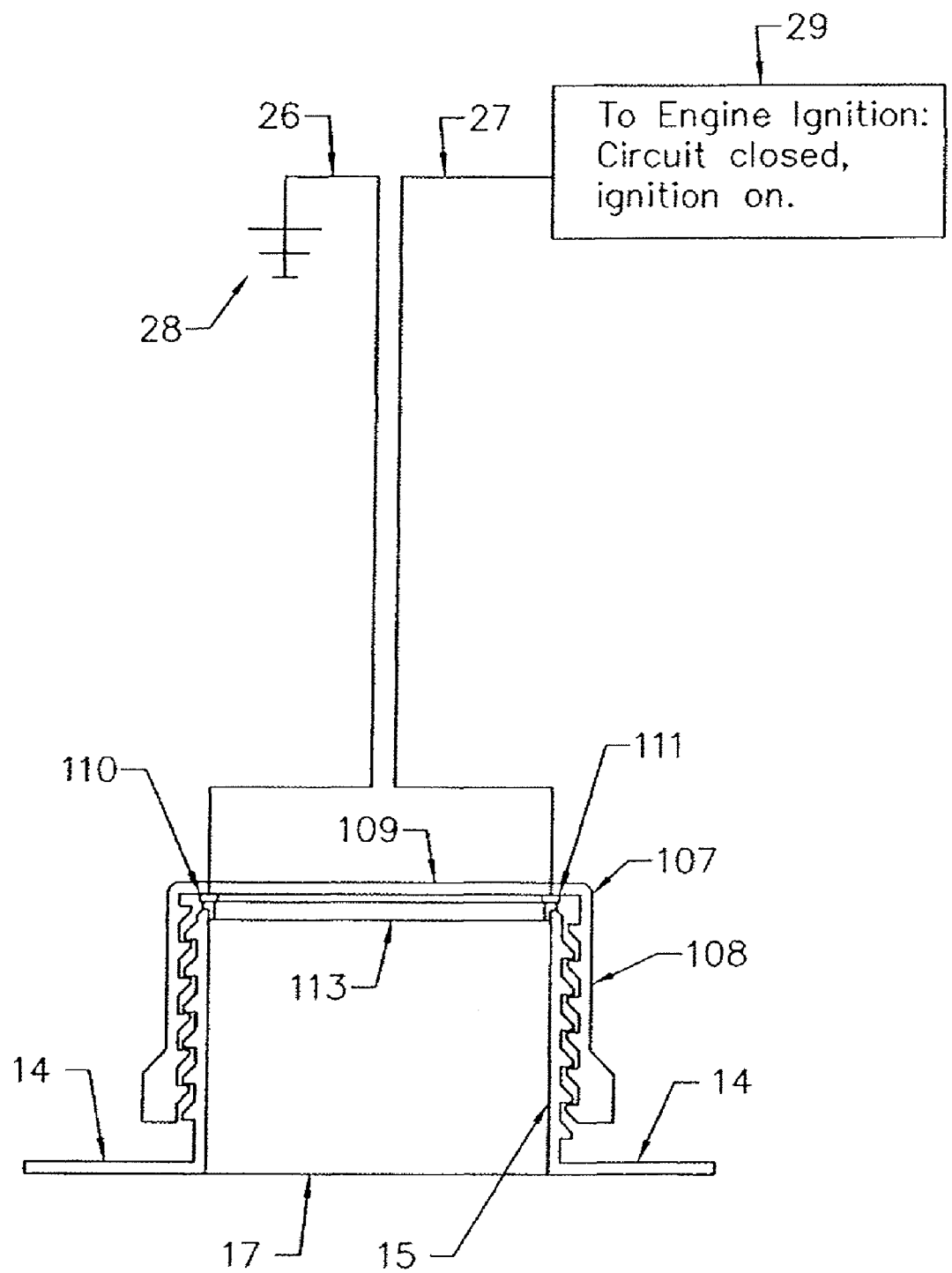
FIG. 26 is a partial sectional elevation view of the preferred embodiment of the apparatus of the present invention illustrating an internal contact switch and with the cap in a closed position.
Figure 27:
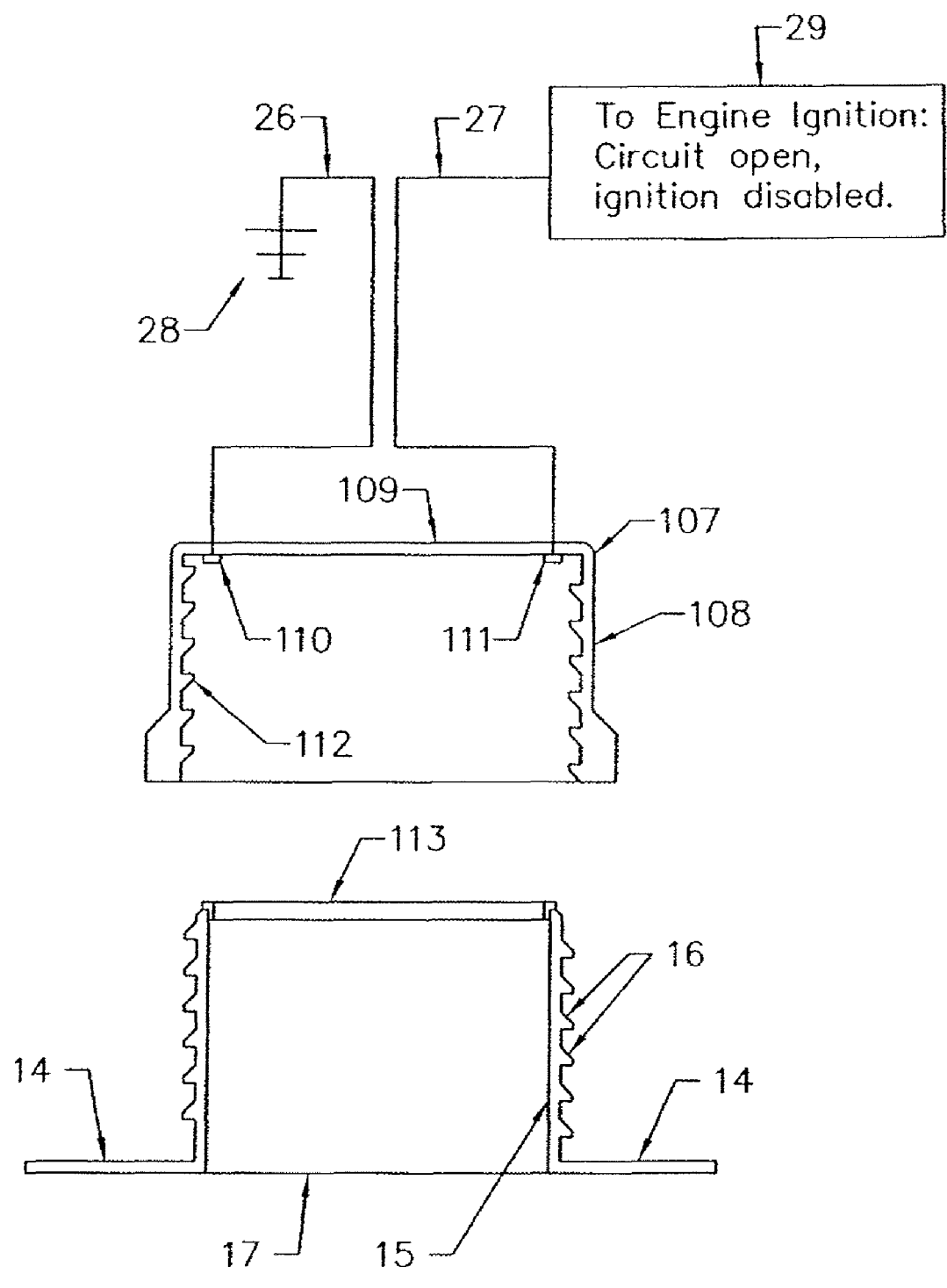
FIG. 27 is a partial sectional elevation view of the preferred embodiment of the apparatus of the present invention illustrating an internal contact switch and with the cap in an open position.

In FIGS. 26 and 27, cap 107 has cylindrical side wall 108, circular top 109 and negative contacts 110, 111 adhered to the underside of circular top 109. Cap 107 also has an internal thread 112 for engaging the external thread 16 of cylindrically shaped flange 15. Conductive ring 113 is mounted to the top of cylindrically shaped flange 15 as shown in FIGS. 25 and 26. In FIG. 27, the contacts 110, 111 are not engaged with conductive ring 113 so that engine ignition is disabled. In FIG. 26, contacts 110, 111 have contacted ring 113 to close a circuit and enable ignition to be activated. Thus, the engine 11 can be operated only when the cap 107 is in the closed position shown in FIG. 25.

Figure 28:
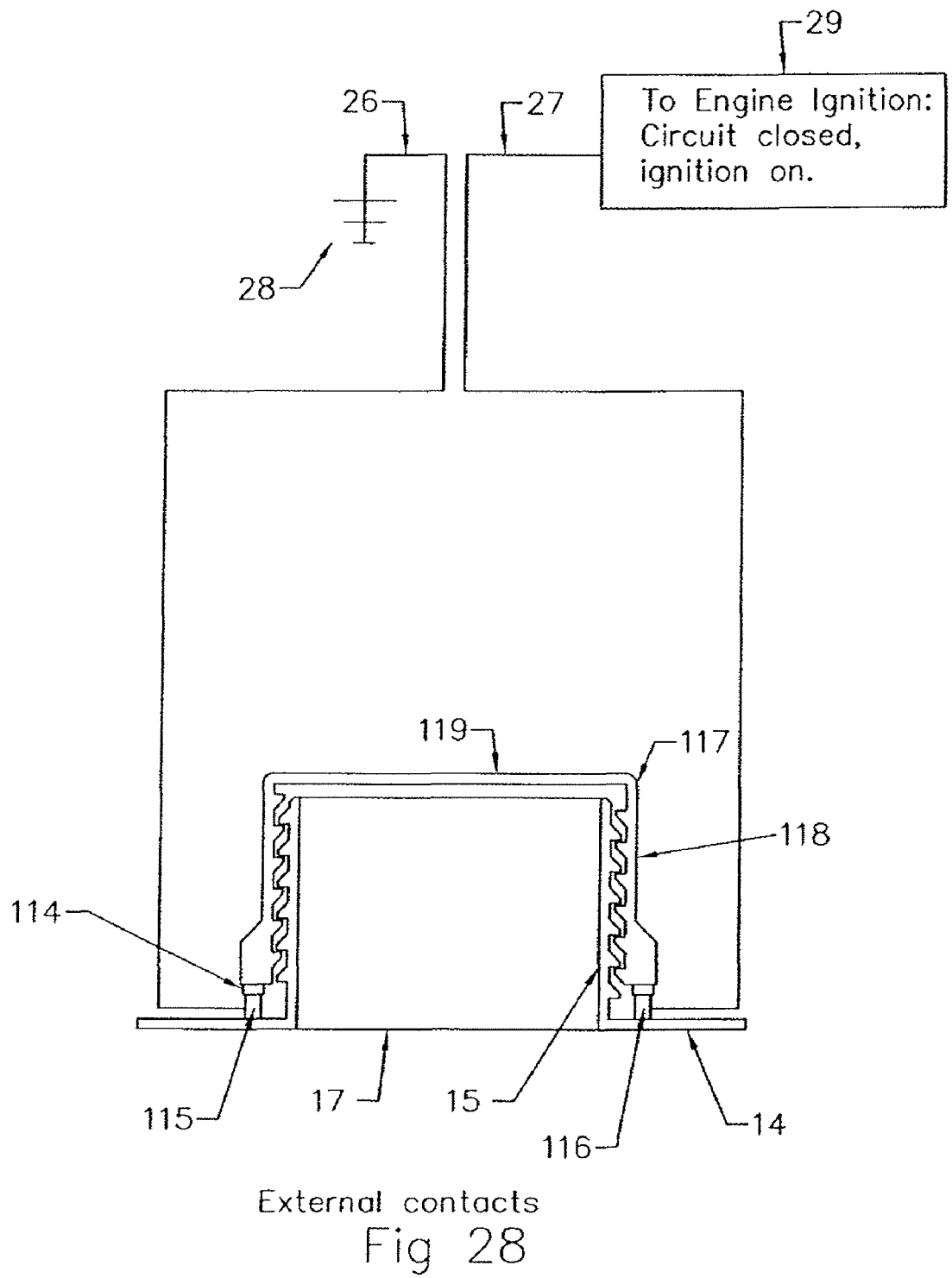
FIG. 28 is a partial sectional elevation view of the preferred embodiment of the apparatus of the present invention illustrating an external contact switch and with the cap in a closed position.
Figure 29:
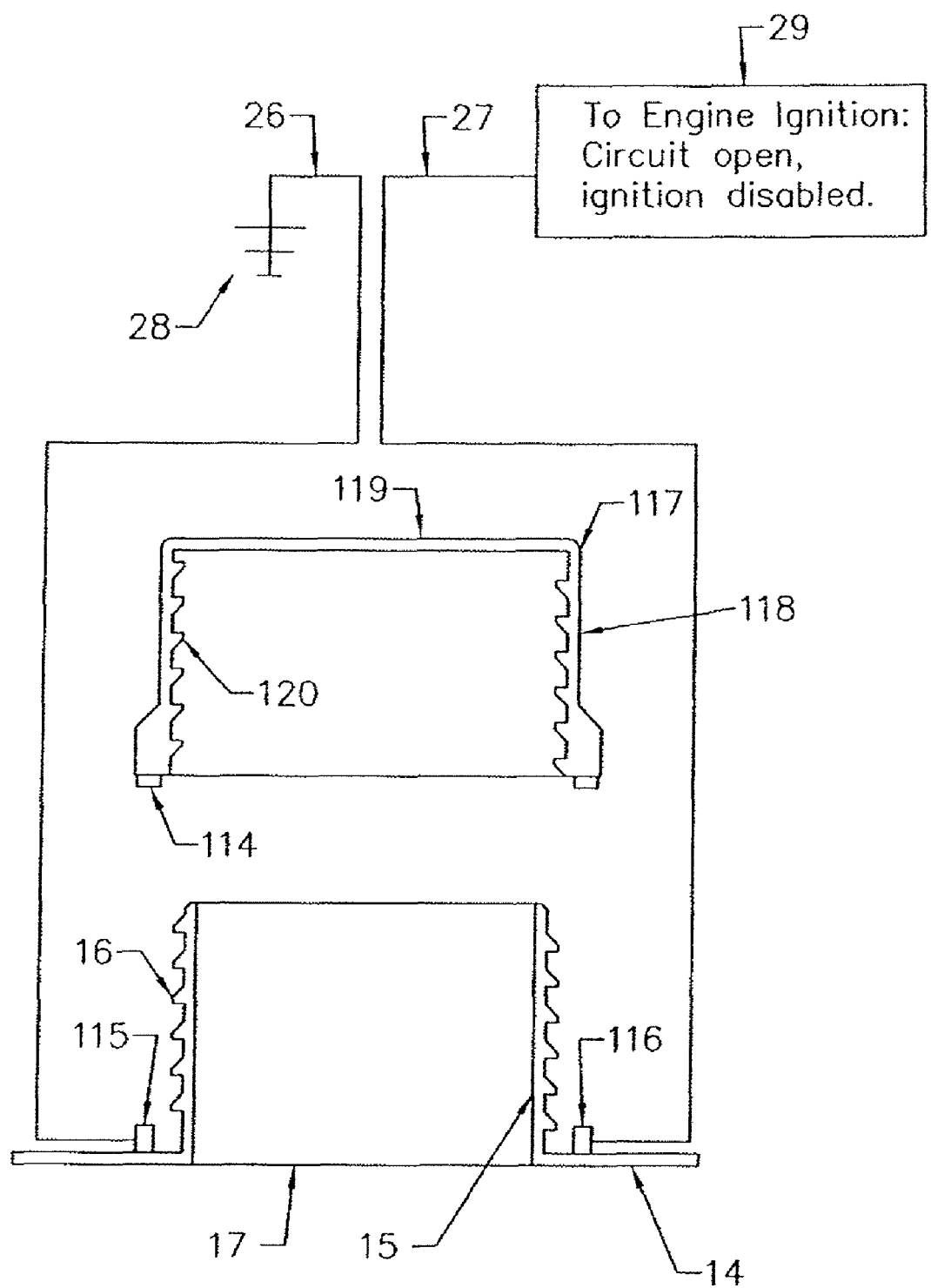
FIG. 29 is a partial sectional elevation view of the preferred embodiment of the apparatus of the present invention illustrating an external contact switch and with the cap in an open position.

In FIGS. 28 and 29, cap 117 has a cylindrically shaped side wall 118, circular top 119, and internal thread 120 for engaging the external thread 16 of cylindrically shaped flange 15. In FIGS. 28 and 29, a conductive ring 114 is attached to the lower end portion of cylindrically shaped annular side wall 118. Contacts 115, 116 are attached to upper surface 14 of tank 12. When the cap 117 is attached to the annular flange 15 as shown in FIG. 27, conductive ring 114 engages both contacts 115, 116 to close a circuit and enable engine ignition. In FIG. 29, the contacts 115, 116 are spaced from conductive ring 114 so that the circuit is open and the ignition is disabled. This arrangement preferably disables the ignition system of the engine, and preferably prevents the spark plug/plugs from firing by disabling the magnoelectric generator or inductive ignition coil. In doing so, the engine would stop running if the cap loosened or was removed. Also, the engine 11 will not run or start even if the starter motor still cycles the engine.

PARTS LIST

The following is a list of suitable parts and materials for the various elements of the preferred embodiment of the present invention.

| Parts Number | Description |
|---|---|
| 10 | safety fuel tank and cap apparatus |
| 11 | engine |
| 12 | fuel tank |
| 13 | starter |
| 14 | upper surface |
| 15 | cylindrically shaped annular flange |
| 16 | external thread |
| 17 | opening |
| 18 | fuel tank |
| 19 | cylindrical wall |
| 20 | cylindrically shaped annular flange |
| 21 | external thread |
| 22 | opening |
| 23 | end wall |
| 24 | tether |
| 25 | cap |
| 26 | negative lead |
| 27 | positive lead |
| 28 | ground |
| 29 | ignition |
| 30 | annular side wall |
| 31 | internal thread |
| 32 | circular top wall |
| 33 | switch housing |
| 34 | concavity |
| 35 | interior |
| 36 | spring |
| 37 | plunger |
| 38 | contact plate |
| 39 | negative contact |
| 40 | positive contact |
| 41 | cap |
| 42 | annular side wall |
| 43 | internal thread |
| 44 | circular top wall |
| 45 | concavity |
| 46 | switch housing |
| 47 | interior |
| 48 | plunger |
| 49 | spring |
| 50 | magnet |
| 51 | reed switch |
| 52 | beveled surface |
| 53 | cap |
| 54 | annular side wall |
| 55 | internal thread |
| 56 | circular top wall |
| 57 | concavity |
| 58 | magnet |
| 59 | spring |
| 60 | follower plate |
| 61 | annular shoulder |
| 62 | reed switch |
| 63 | position arrow |
| 64 | circular plate |
| 65 | shoulder |
| 66 | annular groove |
| 67 | cap |
| 68 | cylindrical side wall |
| 69 | internal thread |
| 70 | circular top |
| 71 | external switch housing |
| 72 | interior |
| 73 | push rod |
| 74 | end portion |

-continued

| Parts Number | Description |
|---|---|
| 75 | contact plate |
| 76 | spring |
| 77 | cap |
| 78 | cylindrical side wall |
| 79 | circular top |
| 80 | external switch housing |
| 81 | interior |
| 82 | reed switch |
| 83 | end portion |
| 84 | magnet |
| 85 | cap |
| 86 | cylindrical side wall |
| 87 | circular top |
| 88 | opening |
| 89 | disk |
| 90 | connecting rod |
| 91 | contact plate |
| 92 | spring |
| 93 | switch housing |
| 94 | safety fuel tank and cap apparatus |
| 95 | enclosed circular contact switch |
| 96 | tether |
| 97 | cap |
| 98 | cylindrically shaped side wall |
| 99 | circular top |
| 100 | internal thread |
| 101 | concavity |
| 102 | annular edge |
| 103 | upper contact ring |
| 104 | lower contact ring |
| 105 | envelope |
| 106 | underside |
| 107 | cap |
| 108 | cylindrical side wall |
| 109 | circular top |
| 110 | negative contact |
| 111 | positive contact |
| 112 | internal thread |
| 113 | conductive ring |
| 114 | conductive ring |
| 115 | negative contact |
| 116 | positive contact |
| 117 | cap |
| 118 | cylindrical side wall |
| 119 | circular top |
| 120 | internal thread |

The foregoing embodiments are presented by way of example only; the scope of the present invention is to be limited only by the following claims.

The invention claimed is:

1. A safety fuel tank and filler cap apparatus for supplying fuel to an internal combustion engine that is started with a magnetoelectric generator, comprising;
   a) an engine having an exposed fuel tank that has a tank wall with an exterior surface, a tank interior for holding fuel, and a fill opening;
   b) an annular fuel filer flange positioned on the exterior surface of the tank wall, said annular flange having a central axis;
   c) a filler cap that removably connects to the fuel filler flange to form a closure of the tank at the fill opening when the cap center generally aligns with the flange central axis, said filler cap and adjoining fuel tank outer surface being configured to enable a user to grip and manipulate said fuel filler cap during removal from said annular fuel filler flange;
   d) a tether line that connects the filler cap to the engine; and e) a switch interfaced between the fuel tank and filler cap via the tether line that disables operation of the magnetoelectric generator when the filler cap is removed from the fuel filler flange.

2. The apparatus of claim 1 wherein the switch is a magnetic switch.

3. The apparatus of claim 2 wherein the switch includes a magnetic portion carried by the filler cap.

4. The apparatus of claim 1 wherein the switch is a mechanical switch.

5. The apparatus of claim 1 wherein the switch is a mechanical switch that moves between operating and disabled positions, the switch including a member that shift positions when the fuel filler cap is separated from the fuel filler flange.

6. A safety fuel tank and filler cap apparatus for supplying fuel to an internal combustion engine that includes a magnoelectric generator for starting the engine, comprising:
 a) an engine having an exposed fuel tank with a fill opening and an annular fuel filler flange at the fill opening surrounded by an adjoining fuel tank outer surface;
 b) a filler cap that removably attaches to the fuel filler flange to form a closure of the tank at the fill opening, said filler cap and adjoining fuel tank outer surface being configured to enable a user to grip and manipulate said fuel filler cap; and
 c) a tether line that connects the fuel filler cap to the engine, the tether comprising at least in part an electrical conductor line;
 d) a switch interfaced between the fuel tank and filler cap with the tether line that disables the magnetoelectric generator when the filler cap is removed from the fuel filler flange; and
 e) wherein the switch includes a switch member mounted on the filler cap that does not interfere with a sealing of the fuel filler flange with the filler cap.

7. The apparatus of claim 6 wherein the fuel filler flange has a threaded portion, and the filler cap has a top and an annular skirt with threads thereon that engage the threaded portion of the flange, wherein the switch member is mounted on the annular skirt in between the threads and the top.

8. The apparatus of claim 6 wherein the filler cap has a top, an annular skirt with internal threads, and an outer surface that is not threaded, wherein the switch member is mounted on the inside of the cap.

9. The apparatus of claim 6 wherein the filler cap has a top, an annular skirt with internal threads, and an outer surface that is not threaded, wherein the switch member includes a switch housing mounted to the cap.

10. A safety fuel tank and filler cap apparatus for supplying fuel to and internal combustion engine that is started with a magnetoelectric generator, comprising:
 a) an engine having an exposed fuel tank having a tank wall with an exterior surface a tank interior for holding fuel, and a fill opening;
 b) an annular fuel filler flange positioned on the exterior surface of the tank wall, said flange including a flange wall extending a short distance from the filler opening in said fuel tank wall, said annular flange having a central axis;
 c) a filler cap that removably connects to the fuel filler flange to form a closure of the tank at the fill opening, said filler cap having a center, wherein the adjoining fuel tank outer surface is configured to enable a user to grip and manipulate said fuel filler cap;
 d) a safety interrupt circuit interfaced between the fuel tank and filler cap that enables the magnetoelectric generator to be disabled when the filler cap is removed from the fuel filler flange by rotating the cap about its center and about the annular flange central axis, said switch including switch portions mounted respectively on the exterior surface of the fuel tank, and on the fuel filler cap, both switch portions being positioned next to the assembly of filler cap and fuel filler flange when the cap forms a closure of the tank;
 e) a tether that forms part of the safety interrupt circuit, the tether being connected at one of its ends to the filler cap and at its other end portion to the engine.

11. The apparatus of claim 10 wherein the safety interrupt circuit includes a switch that is a magnetic switch.

12. The apparatus of claim 11 wherein the switch includes a magnet mounted on the fuel tank and a magnetic switch mounted on the filler cap.

13. The apparatus of claim 11 wherein the switch includes a switch member mounted on the filler cap that does not interfere with a sealing of the fuel filler flange with the filler cap.

14. The apparatus of claim 10 wherein the safety interrupt circuit includes a switch that is a mechanical switch.

15. The apparatus of claim 12 wherein the switch is a mechanical switch that moves between operating and disabled positions the switch including a member that shift positions when the fuel filler cap is separated from the fuel filler flange.

16. The apparatus of claim 10 wherein the fuel filler flange has a threaded portion and the filler cap has a top and an annular skirt with threads thereon that engage the threaded portion of the flange, and wherein the switch member is mounted on the annular skirt spaced from the threads.

17. The apparatus of claim 10 wherein the filler cap has a top, an annular skirt with internal threads, and an outer surface that is not threaded, and wherein the switch member is mounted on the annular skirt.

18. The apparatus of claim 10 wherein the filler cap has a top, an annular skirt with internal threads, and an outer surface that is not threaded and wherein the switch member is mounted on the outer surface.

19. A powered implement, comprising:
 a) a frame;
 b) an internal combustion engine mounted on the frame that includes a magnetoelectric generator for starting the engine;
 c) an exposed fuel tank having a fuel tank wall, a tank interior, a fill opening, a fuel filler flange surrounded by an adjoining fuel tank outer surface, said flange extending a short distance from the filler opening in said fuel tank wall;
 d) a filler cap that removably connects to the fuel filler flange to form a closure of the tank at the fill opening, said filler cap and adjoining fuel tank outer surface being configured to enable a user to grip and manipulate said fuel filler cap;
 e) a circuit that disables the magnetoelectric generator when the filler cap is removed from the tank;
 f) wherein the circuit includes a switch; and
 g) wherein the circuit includes a magnetic switch mounted on the fuel tank and a magnet mounted on the filler cap.

* * * * *